US011198439B2

(12) United States Patent
Mimura

(10) Patent No.: US 11,198,439 B2
(45) Date of Patent: Dec. 14, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yoshitaka Mimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 16/561,180

(22) Filed: Sep. 5, 2019

(65) Prior Publication Data
US 2020/0079379 A1 Mar. 12, 2020

(30) Foreign Application Priority Data

Sep. 12, 2018 (JP) .............................. JP2018-170346

(51) Int. Cl.
| | |
|---|---|
| *B60W 30/18* | (2012.01) |
| *B60R 1/00* | (2006.01) |
| *B60W 10/04* | (2006.01) |
| *B60W 10/20* | (2006.01) |
| *B60W 50/14* | (2020.01) |
| *H04W 4/46* | (2018.01) |

(52) U.S. Cl.
CPC ......... *B60W 30/18163* (2013.01); *B60R 1/00* (2013.01); *B60W 10/04* (2013.01); *B60W 10/20* (2013.01); *B60W 50/14* (2013.01); *H04W 4/46* (2018.02); *B60R 2300/304* (2013.01); *B60W 2050/146* (2013.01); *B60W 2556/65* (2020.02); *B60W 2710/20* (2013.01); *B60W 2720/106* (2013.01)

(58) Field of Classification Search
CPC ........... B60W 30/18163; B60W 10/04; B60W 10/20; B60W 50/14; B60W 2556/65; B60W 2710/20; B60W 2720/106; B60R 1/00; B60R 2300/304; H04W 4/46; G05D 1/024; G05D 1/0251; G05D 1/0257; G05D 1/0223
See application file for complete search history.

(56) References Cited

U.S. PATENT DOCUMENTS

| | | | |
|---|---|---|---|
| 8,346,426 B1 | 1/2013 | Szybalski et al. | |
| 8,738,213 B1 * | 5/2014 | Szybalski ............ | G01C 21/367 701/28 |

(Continued)

*Primary Examiner* — Mussa A Shaawat
(74) *Attorney, Agent, or Firm* — Amin, Turocy & Watson, LLP

(57) ABSTRACT

A vehicle control device including: a display; a recognizer; a driving controller that generates a target trajectory of a subject vehicle on the basis of states of objects recognized and controls one or both of a speed and steering of the subject vehicle on the basis of the generated target trajectory; and a display controller that causes to display images resembling the other vehicles recognized as the objects, wherein the display controller causes to display a first image resembling a first vehicle having an influence on a behavior of the subject vehicle according to the driving controller and a second image resembling a second vehicle having an influence on generation of the target trajectory among the other vehicles recognized as the objects with more emphasis than a third image resembling a third vehicle other than the first vehicle and the second vehicle.

8 Claims, 22 Drawing Sheets

(56) References Cited

U.S. PATENT DOCUMENTS

| | | | |
|---|---|---|---|
| 2007/0290823 A1* | 12/2007 | Watanabe | G08G 1/166 |
| | | | 340/435 |
| 2009/0164062 A1* | 6/2009 | Aoki | B60Q 1/0082 |
| | | | 701/36 |
| 2014/0092237 A1* | 4/2014 | Watanabe | G06K 9/00798 |
| | | | 348/118 |
| 2015/0302259 A1* | 10/2015 | Oshida | G06K 9/46 |
| | | | 382/103 |
| 2017/0285647 A1* | 10/2017 | Saito | B60W 10/20 |
| 2017/0287186 A1* | 10/2017 | Saito | G06T 7/521 |
| 2017/0305460 A1* | 10/2017 | Saito | G06K 9/00798 |
| 2017/0307395 A1* | 10/2017 | Kim | B60R 1/00 |
| 2018/0058879 A1* | 3/2018 | Tayama | B60W 30/12 |
| 2018/0111628 A1* | 4/2018 | Tamagaki | B60W 30/16 |
| 2018/0128635 A1* | 5/2018 | Nakamura | B60W 30/12 |
| 2018/0148072 A1* | 5/2018 | Kamiya | G06K 9/00832 |
| 2018/0178649 A1* | 6/2018 | Mimura | B60K 35/00 |
| 2018/0194367 A1* | 7/2018 | Yamada | B60W 50/14 |
| 2018/0244153 A1* | 8/2018 | Ejiri | G02B 27/01 |
| 2019/0122540 A1* | 4/2019 | Ishikawa | B60R 1/00 |
| 2019/0232976 A1* | 8/2019 | Uetani | B60W 30/182 |
| 2019/0265710 A1* | 8/2019 | Kaneko | B60W 40/08 |
| 2020/0148214 A1* | 5/2020 | Tamagaki | B60W 30/14 |

\* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-170346, filed Sep. 12, 2018, the content of which is incorporated herein by reference.

BACKGROUND

Field of the Invention

The present invention relates to a vehicle control device, a vehicle control method, and a storage medium.

Description of Related Art

In recent years, automated control of driving of vehicles (hereinafter referred to as automated driving) has been researched. In relation to this, a technology for displaying lanes near a subject vehicle and icons representing the subject vehicle and other vehicles on a display screen, and in a case in which it is determined that lane change is appropriate, displaying a turn-signal icon representing a direction of the lane change and a turning zone representing waiting until moving to a lane change zone becomes safe is known (for example, U.S. Pat. No. 8,346,426).

SUMMARY

However, in the conventional technology, it is not clear whether displayed vehicles are recognized only on a system side or there is an influence thereof on driving control of the subject vehicle, and accordingly, there are cases in which a vehicle occupant feels anxiety during the driving control.

An aspect of the present invention is realized in consideration of such situations, and one objective thereof is to provide a vehicle control device, a vehicle control method, and a storage medium capable of performing driving control that provides a more secure feeling to vehicle occupants.

A vehicle control device, a vehicle control method, and a storage medium according to the present invention employ the following configurations.

(1): A vehicle control device according to one aspect of the present invention is a vehicle control device including: a display that displays an image; a recognizer that recognizes objects including other vehicles present in the vicinity of a subject vehicle; a driving controller that generates a target trajectory of the subject vehicle on the basis of states of the objects recognized by the recognizer and controls one or both of a speed and steering of the subject vehicle on the basis of the generated target trajectory; and a display controller that causes to display images resembling the other vehicles recognized as the objects by the recognizer in the display superimposed on an image resembling a road on which the subject vehicle is present, wherein the display controller causes to display a first image resembling a first vehicle having an influence on a behavior of the subject vehicle according to the driving controller and a second image resembling a second vehicle having an influence on generation of the target trajectory among the other vehicles recognized as the objects with more emphasis than a third image resembling a third vehicle other than the first vehicle and the second vehicle.

(2): In the aspect (1) described above, the display controller causes to display the first image with more emphasis than the second image.

(3): In the aspect (1) described above, the display controller causes to display an image indicating a direction in which lane change of the subject vehicle is disturbed for the second image resembling the second vehicle that becomes a factor disturbing the lane change of the subject vehicle.

(4): In the aspect (1) described above, the display controller continues the emphasis display of the first image until the first vehicle has no influence on the behavior of the subject vehicle and continues the emphasis display of the second image until the second vehicle has no influence on the generation of the target trajectory.

(5): In the aspect (1) described above, a communication device that performs inter-vehicle communication with the other vehicles is further included, and, in a case in which the behavior of the subject vehicle changes in accordance with a behavior of another vehicle received by the communication device, the display controller causes to display the other vehicle with which the inter-vehicle communication has been performed with emphasis as the first image.

(6): In the aspect (1) described above, the display controller changes a display form of the image resembling the road on the basis of a result of recognition acquired by the recognizer.

(7): A vehicle control method according to one aspect of the present invention is a vehicle control method using an in-vehicle computer mounted in a subject vehicle including a display that displays images, the vehicle control method including: recognizing objects including other vehicles present in the vicinity of the subject vehicle; generating a target trajectory of the subject vehicle on the basis of states of the recognized objects; controlling one or both of a speed and steering of the subject vehicle on the basis of the generated target trajectory; displaying images resembling the other vehicles recognized as the objects in the display superimposed on an image resembling a road on which the subject vehicle is present; and displaying a first image resembling a first vehicle having an influence on a behavior of the subject vehicle and a second image resembling a second vehicle having an influence on generation of the target trajectory among the other vehicles recognized as the objects with more emphasis than a third image resembling a third vehicle other than the first vehicle and the second vehicle.

(8): A storage medium according to one aspect of the present invention is a computer-readable non-transitory storage medium having a program stored therein, the program causing an in-vehicle computer mounted in a subject vehicle including a display that displays images to execute: recognizing objects including other vehicles present in the vicinity of the subject vehicle; generating a target trajectory of the subject vehicle on the basis of states of the recognized objects; controlling one or both of a speed and steering of the subject vehicle on the basis of the generated target trajectory; displaying images resembling the other vehicles recognized as the objects in the display superimposed on an image resembling a road on which the subject vehicle is present; and displaying a first image resembling a first vehicle having an influence on a behavior of the subject vehicle and a second image resembling a second vehicle having an influence on generation of the target trajectory among the other vehicles recognized as the objects with more emphasis than a third image resembling a third vehicle other than the first vehicle and the second vehicle.

According to the aspects (1) to (8) described above, driving control providing a more secure feeling for a vehicle occupant can be performed.

DESCRIPTION OF EMBODIMENTS

Hereinafter, a vehicle control device, a vehicle control method, and a storage medium according to embodiments of the present invention will be described with reference to the drawings. In an embodiment, an example in which a display device displays results of recognition of the vicinity of a vehicle when the vehicle performs automated driving (autonomous driving) control. Here, the automated driving control represents controlling one or both of steering and speed of a vehicle without depending on a driving operation according to a vehicle occupant of the vehicle. The automated driving control is one kind of driving control assisting a driving operation of a vehicle occupant such as an adaptive cruise control system (ACC) or a lane keeping assistance system (LKAS).

[Entire Configuration]

Figure 1:
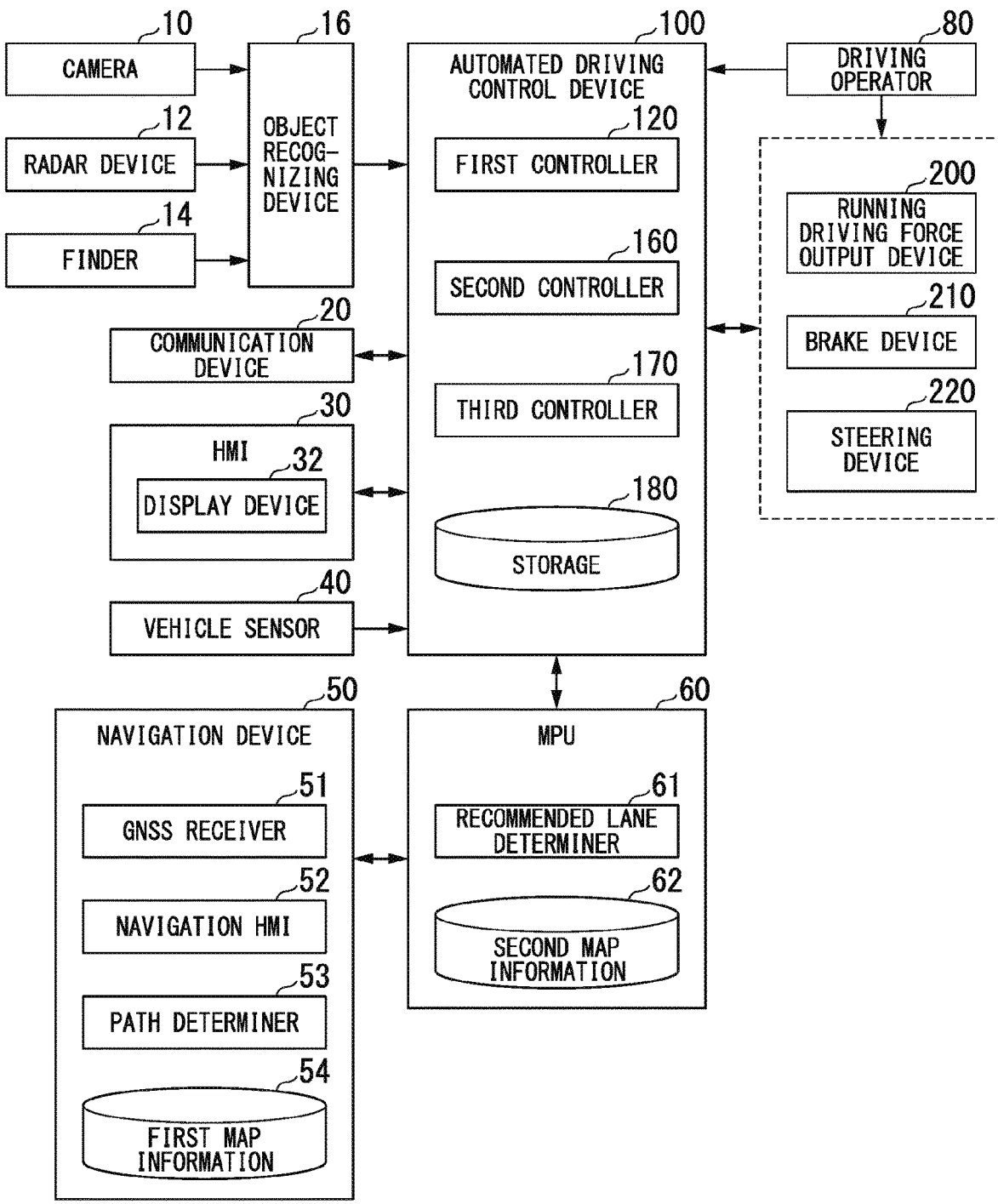
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted (hereinafter, referred to as a subject vehicle M) is, for example, a vehicle having two wheels, three wheels, four wheels, or the like, and a driving source thereof includes an internal combustion engine such as a diesel engine or a gasoline engine, an electric motor, or a combination thereof. The electric motor operates using power generated using a power generator connected to an internal combustion engine or power discharged from a secondary cell or a fuel cell.

The vehicle system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration illustrated in FIG. 1 is merely one example, and thus parts of the configuration may be omitted or other additional components may be added. A combination of the HMI 30 and the automated driving control device 100 is one example of a "vehicle control device".

The camera 10, for example, is a digital camera using a solid-state imaging device such as a charge coupled device (CCD) or a complementary metal oxide semiconductor (CMOS). The camera 10 is installed at an arbitrary place on the subject vehicle M. In the case of forward imaging, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radio waves such as millimeter waves to the vicinity of the subject vehicle M and detects at least a position of (a distance and an azimuth to) an object by detecting radio waves (reflected waves) reflected by the object. The radar device 12 is installed at an arbitrary place on the subject vehicle M. The radar device 12 may detect a position and a speed of an object using a frequency modulated continuous wave (FM-CW) system.

The finder 14 is a light detection and ranging (LIDAR) device. The finder 14 emits light to the vicinity of the subject vehicle M and measures scattered light. The finder 14 detects a distance with respect to a target on the basis of a time from light emission to light reception. The emitted light, for example, is pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automated driving control device 100. The object recognizing device 16 may output results of detection using the camera 10, the radar device 12, and the finder 14 to the automated driving control device 100 as they are. The object recognizing device 16 may be omitted from the vehicle system 1.

The communication device 20, for example, communicates with other vehicles present in the vicinity of the subject vehicle M (inter-vehicle communication) using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the subject vehicle M and receives an input operation performed by a vehicle occupant. For example, The HMI 30 includes a display device 32, a speaker, a buzzer, a touch panel, switches, keys, and the like. The display device 32, for example, includes a first display 32A and a second display 32B. The display device 32 is one example of a "display".

Figure 2:
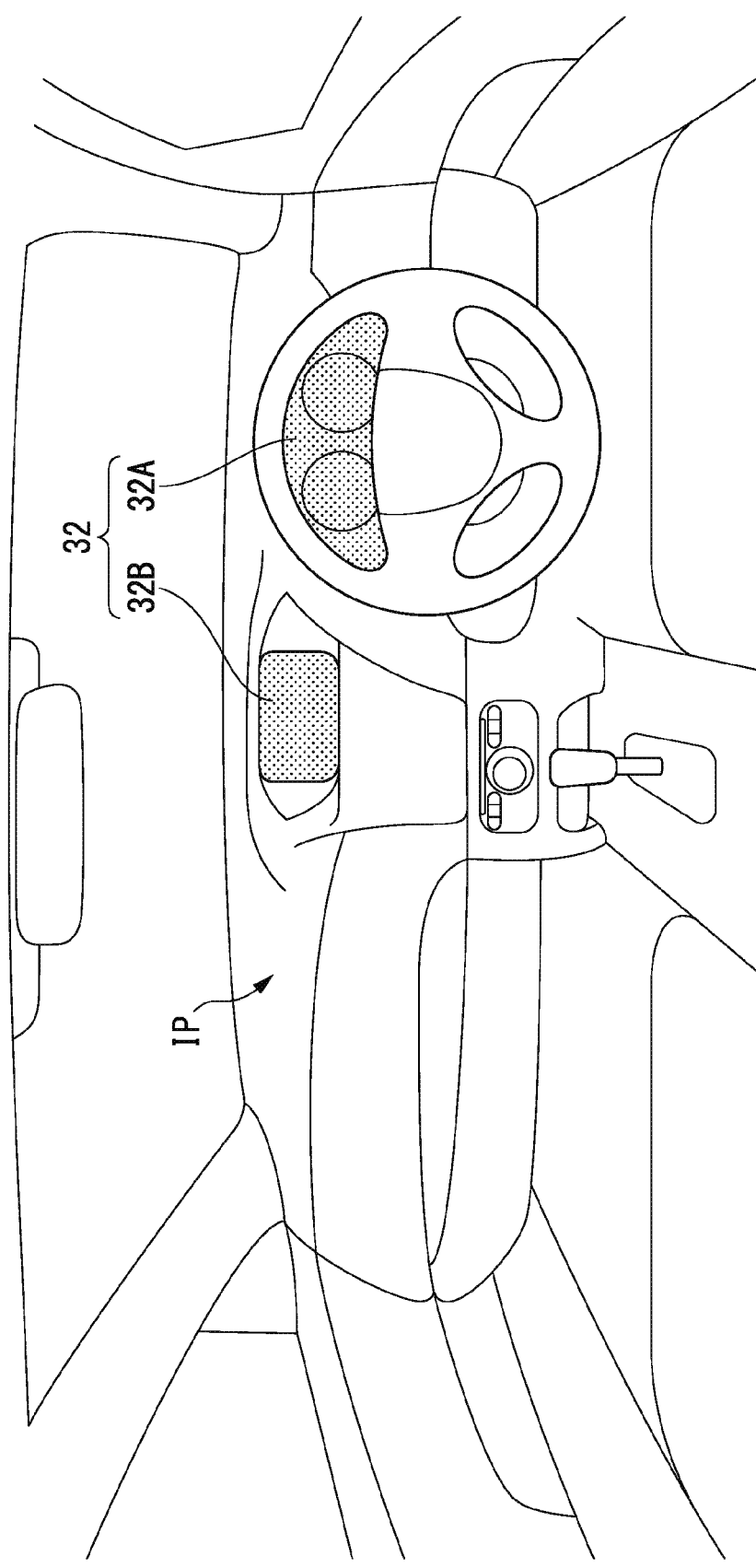
FIG. 2 is a diagram schematically illustrating a view of a vehicle cabin of a subject vehicle M.

FIG. 2 is a diagram schematically illustrating a view of a vehicle cabin of a subject vehicle M. For example, the first display 32A is disposed near a front face of a driver' seat (for example, a seat that is the closest to a steering wheel) on an instrument panel IP and is disposed at a position at which it can be visually recognized by a vehicle occupant through a gap of the steering wheel or over the steering wheel. The first display 32A, for example, is a liquid crystal display (LCD), an organic electro luminescence (EL) display device, or the like. In the first display 32A, information required for running of the subject vehicle M at the time of manual driving or at the time of automated driving is displayed as an image. The information required for running of the subject vehicle M at the time of manual driving, for example, is a speed, an engine revolution number, an amount of remaining fuel, a radiator water temperature, and a running distance of the subject vehicle M and other information. The information required for running of the subject vehicle M at the time of automated driving, for example, is information such as a future locus (target trajectory) of the subject vehicle M, presence/absence of lane change and a lane that is a lane change destination, recognized lanes (partition lines), the other vehicles, and the like. A part or the whole of information required for running of the subject vehicle M at the time of manual driving may be included in the information required for running of the subject vehicle M at the time of automated driving.

The second display 32B, for example, is disposed near the center of the instrument panel IP. The second display 32B, for example, similarly to the first display 32A, is an LCD, an organic EL display device, or the like. The second display 32B, for example, displays an image corresponding to a navigation process executed by the navigation device 50, and the like. The second display 32B may display a television program, play a DVD, or display a content such as a downloaded movie. A head-up display (HUD) device may be included in the display device 32 instead of (or in addition to) the first display 32A and the second display 32B. The HUD device is a device causing an image to be visually recognized with being superimposed on a landscape and, as one example, is a device allowing an observer to visually recognize a virtual image by transmitting light including an image to a front windshield or a combiner of the subject vehicle M. The observer, for example, is a driver and may be a vehicle occupant other than the driver.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a path determiner 53. The navigation device 50 stores first map information 54 in a storage device such as a hard disk drive (HDD) or a flash memory.

The GNSS receiver 51 identifies a position of a subject vehicle M on the basis of signals received from GNSS satellites. The position of the subject vehicle M may be identified or complemented by an inertial navigation system (INS) using an output of the vehicle sensor 40.

The navigation HMI 52 includes a display device, a speaker, a touch panel, a key, and the like. A part or the whole of the navigation HMI 52 and the HMI 30 described above may be configured to be shared.

The path determiner 53, for example, determines a path to a destination input by a vehicle occupant using the navigation HMI 52 (hereinafter referred to as a path on a map) from a position of the subject vehicle M identified by the GNSS receiver 51 (or an input arbitrary position) by referring to the first map information 54. The first map information 54, for example, is information in which a road form is represented by respective links representing roads and respective nodes connected using the links. The first map information 54 may include a curvature of each road, point of interest (POI) information, and the like. A path on the map is output to the MPU 60.

The navigation device 50 may perform path guidance using the navigation HMI 52 on the basis of the path on the map. The navigation device 50, for example, may be realized by a function of a terminal device such as a smartphone or a tablet terminal held by a vehicle occupant. The navigation device 50 may transmit a current location and a destination to a navigation server through the communication device 20 and acquire a path equivalent to the path on the map received from the navigation server.

The MPU 60, for example, includes a recommended lane determiner 61 and stores second map information 62 in a storage device such as an HDD or a flash memory. The recommended lane determiner 61 divides the path on the map provided from the navigation device 50 into a plurality of blocks (for example, divides the route into blocks of 100 [m] in the advancement direction of the vehicle) and determines a recommended lane for each block by referring to the second map information 62. The recommended lane determiner 61 determines in which of lanes numbered from the left side to run. In a case in which there is a branching place in the path on the map, the recommended lane determiner 61 determines a recommended lane such that the subject vehicle M can run along a reasonable path for advancement to a branching destination.

The second map information 62 is map information having higher accuracy than the first map information 54. The second map information 62, for example, includes information on the centers of respective lanes, information on boundaries between lanes, information of types of lanes, and the like. In addition, in the second map information 62, road information, traffic regulation information, address information (addresses and postal codes), facility information, telephone number information, and the like may be included. The second map information 62 may be updated as needed by the communication device 20 communicating with another device.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or some or all of the running driving force output device 200, the brake device 210, and the steering device 220.

The automated driving control device 100, for example, includes a first controller 120, a second controller 160, a third controller 170, and a storage 180. The first controller 120, the second controller 160, and the third controller 170, for example, are realized by a computer processor such as a central processing unit (CPU) executing a program (software). Some or all of these constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by software and hardware in cooperation. The program may be stored in the storage device (a storage device including a non-transitory storage medium) 180 of the automated driving control device 100 in advance or may be stored in a storage medium (a non-transitory storage medium) such as a DVD or a CD-ROM that can be loaded or unloaded and installed in the storage 180 by loading the storage medium into a drive device.

The storage 180, for example, is realized by using an HDD, a flash memory, an electrically erasable programmable read only memory (EEPROM), a read only memory (ROM), a random access memory (RAM), or the like. The storage 180, for example, stores programs that are read and executed by a processor and the like.

Figure 3:
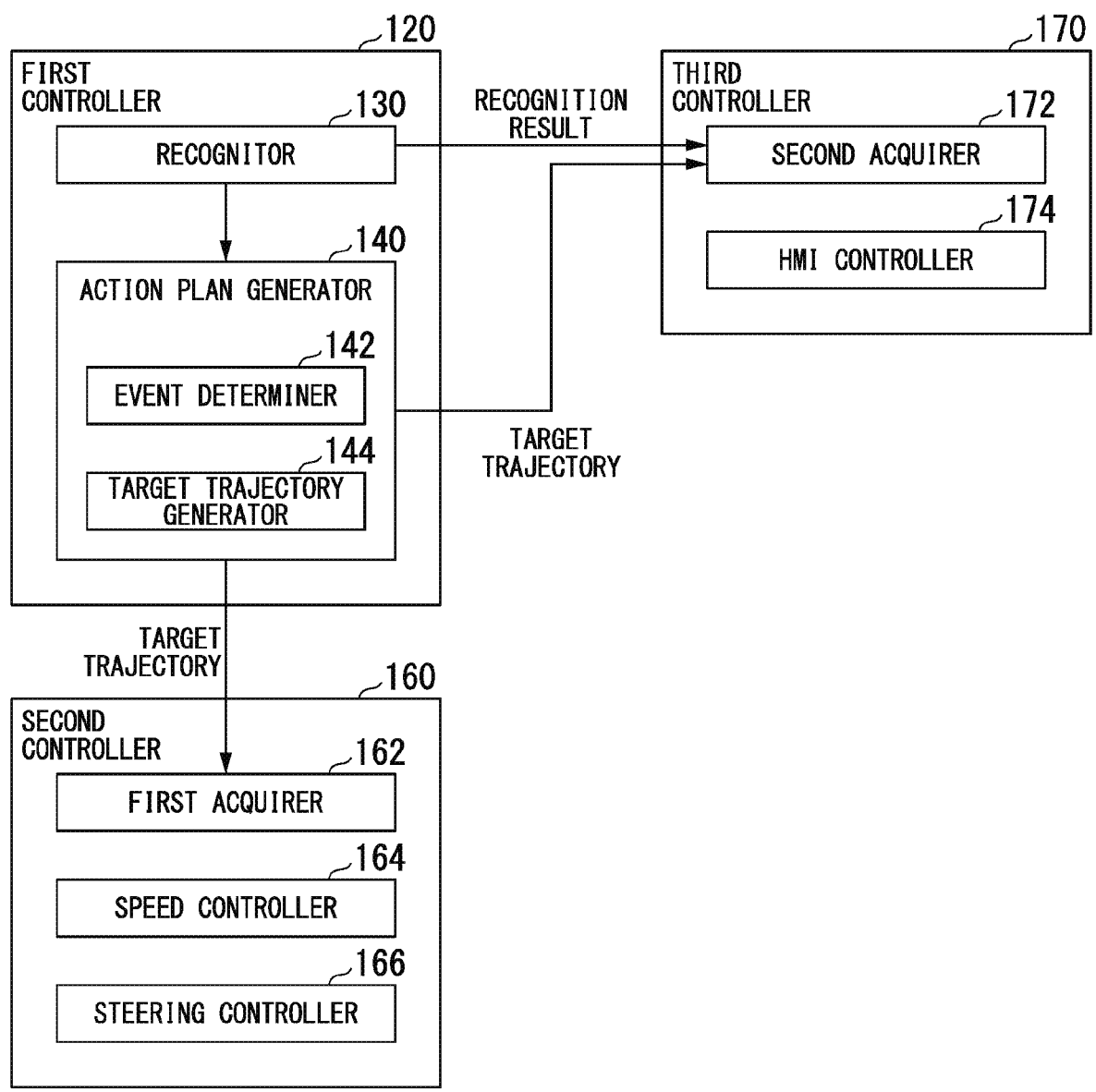
FIG. 3 is a functional configuration diagram of a first controller, a second controller, and a third controller.

FIG. 3 is a functional configuration diagram of the first controller 120, the second controller 160, and the third controller 170. The first controller 120, for example, includes a recognizer 130 and an action plan generator 140. The first controller 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (a traffic light, road markings, and the like that can be used for pattern matching are present) at the same time and comprehensively evaluating both recognitions by assigning scores to them. Accordingly, the reliability of automated driving is secured.

The recognizer 130 recognizes objects present in the vicinity of the subject vehicle M on the basis of information input from the camera 10, the radar device 12, and the finder 14 through the object recognizing device 16. For example, objects recognized by the recognizer 130 are other vehicles such as bicycles, motorcycles, and four-wheel vehicles. The objects include pedestrians, road marks, road signs, partition lines, electric poles, guard rails, fallen objects, and the like. The recognizer 130 recognizes states such as a position, a speed, an acceleration, and the like of each object. For example, the position of an object is recognized as a position on relative coordinates having a representative point (a center of gravity, a driving shaft center, or the like) of the subject vehicle M as an origin (in other words, a relative position with respect to the subject vehicle M) and is used for control. The position of an object may be represented using a representative point such as a center of gravity, or a corner of the object and may be represented using a represented area. A "state" of an object may include an acceleration, a jerk, or an "action state" (for example, whether or not the object is changing lanes or will change lanes) of the object in a case in which the object is a moving body such as another vehicle.

For example, the recognizer 130 recognizes a first vehicle that has an influence on the behavior of the subject vehicle M according to the second controller 160, a second vehicle that has an influence on the generation of a target trajectory according to the action plan generator 140, and a third vehicle not belonging to the first vehicle and the second vehicle among the other vehicles recognized as object. The first vehicle that has an influence on the behavior of the subject vehicle M, for example, is another vehicle that is a following target of the subject vehicle M or another vehicle of which a time-to-collision (TTC) for the subject vehicle M is equal to or shorter than a threshold (one example of an action influence target object). The second vehicle that has an influence on the generation of a target trajectory, for example, is another vehicle having a high likelihood of being a factor for disturbing lane change of the subject vehicle M. Another vehicle having a high likelihood of being a factor for disturbing lane change, for example, is another vehicle for which a time-to-collision (TTC) in a case in which it is assumed that the subject vehicle M performs lane change is equal to or shorter than a threshold. Each of the second vehicle and the third vehicle is one example of an action influencing external object that has no direct influence on the current behavior of the subject vehicle M. The third vehicle is a vehicle that does not disturb the generation of an action plan of the subject vehicle M.

For example, the recognizer 130 recognizes a road shape in the vicinity of the subject vehicle M. For example, the recognizer 130 recognizes an own lane in which the subject vehicle M is running and an adjacent lane adjacent to the own lane. For example, the recognizer 130 recognizes the own lane and the adjacent lane by comparing a pattern of road partition lines (for example, an arrangement of solid lines and broken lines) acquired from the second map information 62 with a pattern of road partition lines in the vicinity of the subject vehicle M recognized from an image captured by the camera 10.

The recognizer 130 may recognize the own lane and the adjacent lane by recognizing running road boundaries (road boundaries) including road partition lines, road shoulders, curbstones, a median strip, guard rails, and the like instead of road partition lines. In this recognition, the location of the subject vehicle M acquired from the navigation device 50 and a processing result acquired by the INS may be taken into account as well. The recognizer 130 recognizes a temporary stop line, an obstacle, a red light, a tollgate, and other road events.

When an own lane is recognized, the recognizer 130 recognizes a relative position and a posture of the subject vehicle M with respect to the own lane. The recognizer 130, for example, may recognize a deviation of the reference point of the subject vehicle M from the lane center and an angle formed with respect to a line in which the lane center in the advancement direction of the subject vehicle M is aligned as the relative position and the posture of the subject vehicle M with respect to the own lane. Instead of this, the recognizer 130 may recognize the position of the reference point of the subject vehicle M with respect to one side end portion (a road partition line or a road boundary) of the own lane or the like as the relative position of the subject vehicle M with respect to the own lane.

The action plan generator 140, for example, includes an event determiner 142 and a target trajectory generator 144. The event determiner 142 determines an event of automated driving in a path along which recommended lanes are determined. An event is information that defines a running form of the subject vehicle M.

As events, for example, a constant-speed running event in which the subject vehicle M is caused to run at a constant speed in the same running lane, a following running event in which the subject vehicle M is caused to follow another vehicle that is present within a predetermined distance (for example, within 100 [m]) in front of the subject vehicle M and is the closest to the subject vehicle M (hereinafter, referred to as a vehicle running ahead as is necessary), a lane changing event in which the subject vehicle M is caused to change the lane from the own lane to an adjacent lane, a branching event in which the subject vehicle M is caused to branch to a lane on a destination side at a branching point of a road, a merging event in which the subject vehicle M is caused to merge into a main line at a merging point, and a taking over event in which the subject vehicle M is caused to end automated driving and switch to manual driving, and the like are included. Here, the "following running", for example, may have a running form in which an inter-vehicle distance (relative distance) between the subject vehicle M and a vehicle running ahead is maintained to be constant or may have a running form in which the subject vehicle M is caused to run at the center of the own lane in addition to maintenance of an inter-vehicle distance between the subject vehicle M and a vehicle running head to be constant. In the events, for example, a takeover event in which the subject vehicle M is caused to temporarily change lanes to an adjacent lane, takes over a vehicle running ahead in the adjacent lane, and then change lanes to the original lane again, or which causes the subject vehicle M to approach a partition line partitioning the own lane, take over a vehicle running ahead within the same lane without changing the lane of the subject vehicle M to the adjacent lane, and then return to the original position (for example, the lane center), an avoidance event in which the subject vehicle M is caused to perform at least one of braking and steering for avoiding an obstacle present in front of the subject vehicle M, and the like may be included.

The event determiner 142, for example, may change an event that has already been determined for a current section to another event or determine a new event for the current section in accordance with a situation of the vicinity recognized by the recognizer 130 at the time of running of the subject vehicle M.

The event determiner 142, for example, may change an event that has already been determined for a current section to another event or determine a new event for the current section in accordance with an operation of a vehicle occupant on an in-vehicle device. For example, in a case in which a turn indicator lever (a direction indicator) is operated by a vehicle occupant, the event determiner 142 may change an event that has already been determined for a current section to a lane changing event or newly determine a lane changing event for the current section.

The target trajectory generator 144 generates a future target trajectory causing the subject vehicle M to run in a recommended lane determined by the recommended lane determiner 61 in principle and, in order to respond to situations of the vicinity when the subject vehicle M runs in the recommended lane, causing the subject vehicle M to automatedly (not depending on an operation of a driver) run in a running form defined by an event. In the target trajectory, for example, a position element determining a future position of the subject vehicle M and a speed element determining a future speed and the like of the subject vehicle M are included.

For example, the target trajectory generator 144 determines a plurality of points (locus points) to be sequentially reached by the subject vehicle M as position elements of the target trajectory. Locus points are points to be reached by the subject vehicle M for every predetermined running distance (for example, about several [m]). The predetermined running distance, for example, may be calculated in accordance with a distance along the road when the subject vehicle advances along a path.

The target trajectory generator 144 determines a target speed and a target acceleration for every predetermined sampling time (for example, a fraction of [sec]) as speed elements of the target trajectory. A locus point may be, for every predetermined sampling time, a position to be reached by the subject vehicle M at the sampling time. In this case, a target speed and a target acceleration may be determined in accordance with intervals of sampling times and locus points. The target trajectory generator 144 outputs information representing the generated target trajectory to the second controller 160.

The second controller 160 controls the running driving force output device 200, the brake device 210, and the steering device 220 such that the subject vehicle M passes through a target trajectory generated by the target trajectory generator 144 at a scheduled time.

The second controller 160, for example, includes a first acquirer 162, a speed controller 164, and a steering controller 166. A combination of the event determiner 142, the target trajectory generator 144, and the second controller 160 is one example of a "driving controller".

The first acquirer 162 acquires information of a target trajectory (locus points) from the target trajectory generator 144 and stores the acquired information in a memory of the storage 180.

The speed controller 164 controls one or both of the running driving force output device 200 and the brake device 210 on the basis of speed elements (for example, a target speed, a target acceleration, and the like) included in the target trajectory stored in the memory.

The steering controller 166 controls the steering device 220 in accordance with position elements (for example, a curvature representing a degree of bend of the target trajectory and the like) included in the target trajectory stored in the memory. Hereinafter, control of the running driving force output device 200 and one or both of the brake device 210 and the steering device 220 will be referred to as "automated driving control" in description.

The processes of the speed controller 164 and the steering controller 166, for example, are realized by a combination of feed-forward control and feedback control. As one example, the steering controller 166 executes feed-forward control according to a curvature of a road disposed in front of the subject vehicle M and feedback control based on a deviation from a target trajectory in combination.

The running driving force output device 200 outputs a running driving force (torque) for causing the vehicle to run to driving wheels. The running driving force output device 200, for example, includes a combination of an internal combustion engine, an electric motor, a transmission, and the like and a power electronic controller (ECU) controlling these. The power ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

The third controller 170, for example, includes a second acquirer 172 and an HMI controller 174. The HMI controller 174 is one example of a "display controller". The second acquirer 172 acquires information of results recognized by the recognizer 130 and acquires information of a target trajectory generated by the target trajectory generator 144.

The HMI controller 174 controls the HMI 30 on the basis of information acquired by the second acquirer 172 and outputs various kinds of information to the HMI 30. For example, the HMI controller 174 displays an image resembling the subject vehicle M (hereinafter, referred to as a subject vehicle image), an image resembling another vehicle m recognized by the recognizer 130 (hereinafter referred to as another vehicle image), and an image resembling lanes (including an own lane and adjacent lanes) (hereinafter, referred to as a lane image) recognized by the recognizer 130 in the display device 32 of the HMI 30 in a superimposing manner. The HMI controller 174 may display an image resembling a target trajectory generated by the target trajectory generator 144 (hereinafter, referred to as a target trajectory image) to overlap the lane image in the display device 32. The HMI controller 174 displays each of the images described above in one or both of the first display 32A and the second display 32B designated by a vehicle occupant. The HMI controller 174 may display the images described above in a display that is determined in accordance with a running form of the subject vehicle M.

[Driving Control Based on Event]

Figure 4:
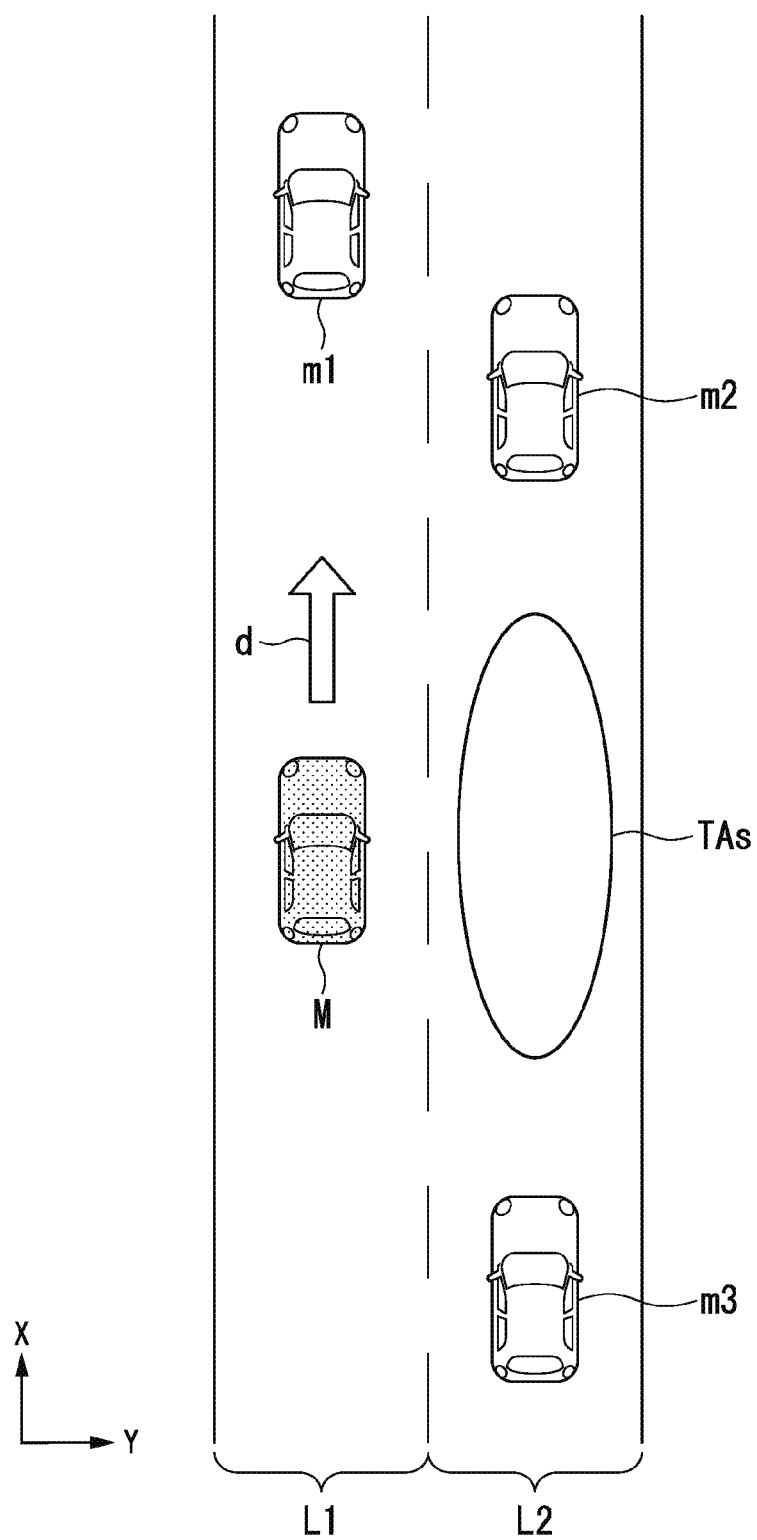
FIG. 4 is a diagram (1) illustrating a situation in which the subject vehicle M is caused to perform lane change.
Figure 5:
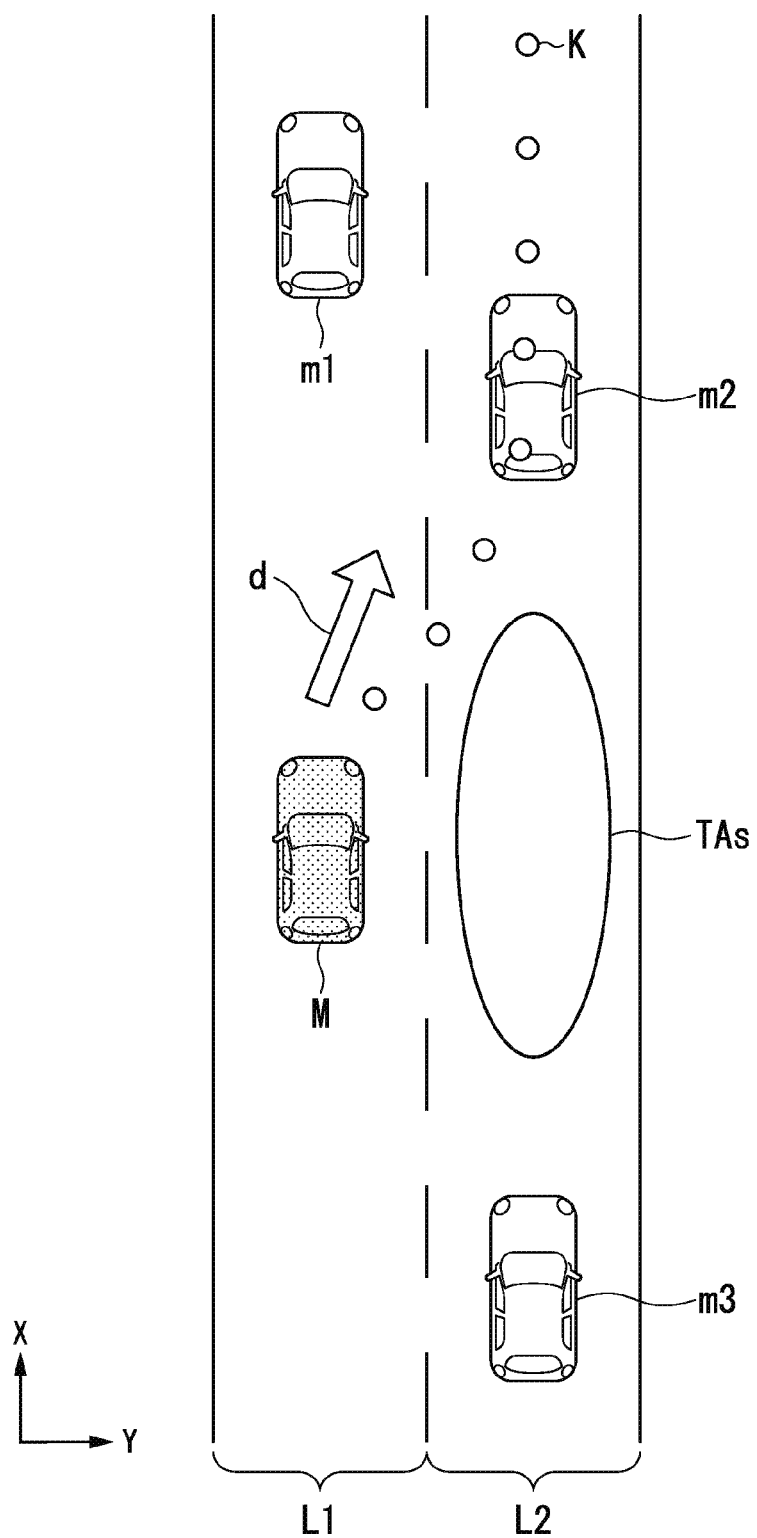
FIG. 5 is a diagram (2) illustrating a situation in which the subject vehicle M is caused to perform lane change.
Figure 6:
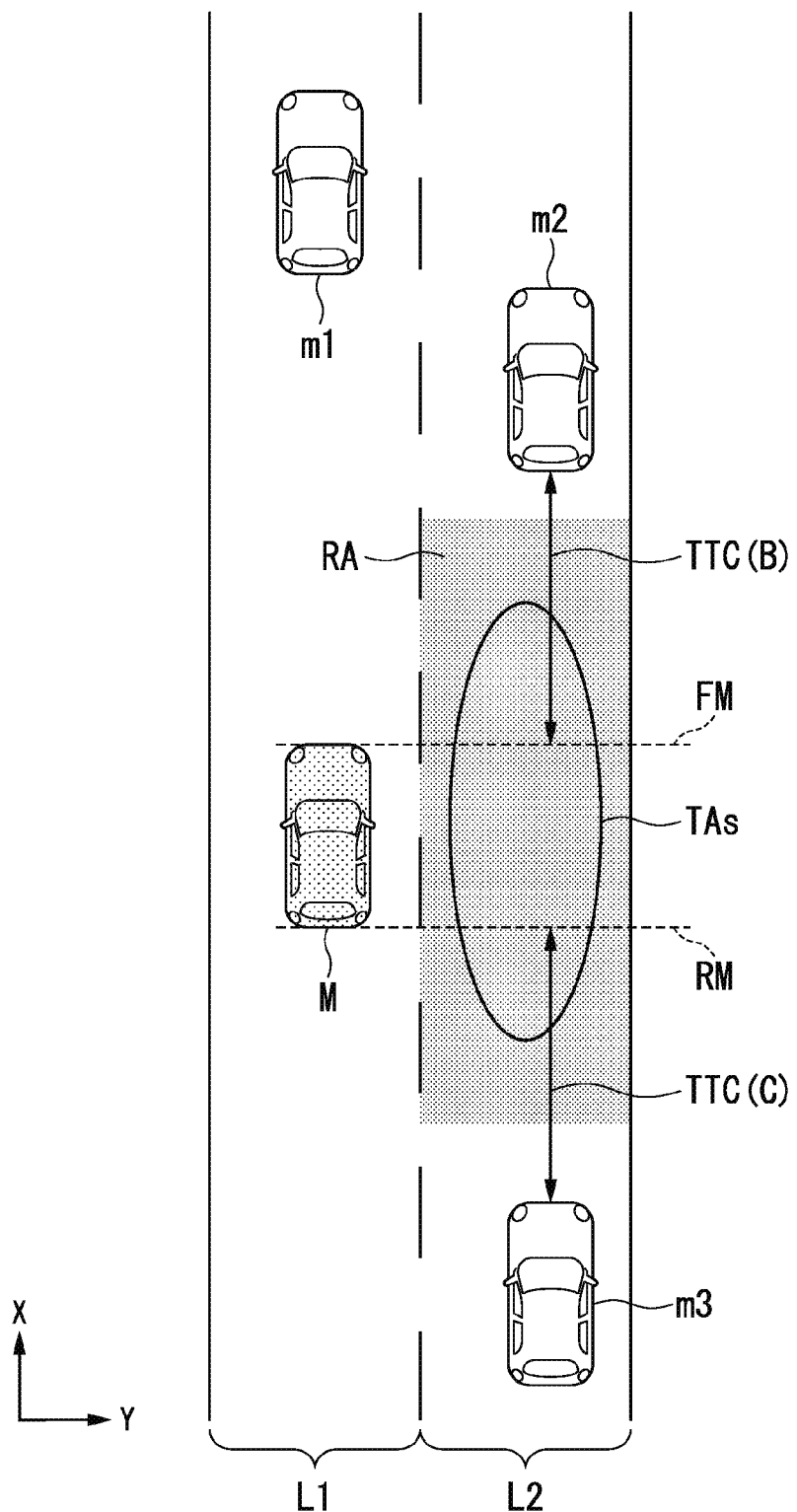
FIG. 6 is a diagram (3) illustrating a situation in which the subject vehicle M is caused to perform lane change.

Hereinafter, as one example, a situation in which a subject vehicle M is running in a section in which a lane changing event is planned, in other words, a situation in which the subject vehicle M is caused to change lanes, will be described. FIGS. 4 to 6 are diagrams (1 to 3) illustrating situations in which the subject vehicle M is caused to perform a lane change. In the drawing, an own lane L1 is illustrated, and an adjacent lane L2 adjacent to the own lane is illustrated. A direction X represents an extending direction of a road or an advancement direction of the subject vehicle M, and a direction Y represents a vehicle width direction that is orthogonal to the direction X.

In the example illustrated in FIG. 4, in a case in which an event of a current section is a lane changing event, the target trajectory generator 144 selects two other vehicles among a plurality of other vehicles running in the adjacent lane L2 and sets a lane change target position TAs between the selected two other vehicles. The lane change target position TAs is a position of a lane change destination that is a target and is a relative position between the subject vehicle M and two other vehicles. In the example illustrated in the drawing, since other vehicles m2 and m3 are running in the adjacent lane, the target trajectory generator 144 sets a lane change target position TAs between the other vehicles m2 and m3. In a case in which there is only one other vehicle in the adjacent lane L2, the target trajectory generator 144 may set a lane change target position to an arbitrary position on a side in front of or behind the other vehicle. In a case in which there is no other vehicle in the adjacent lane L2, the target trajectory generator 144 may set the lane change target position TAs to an arbitrary position in the adjacent lane L2. Hereinafter, another vehicle running immediately in front of the lane change target position TAs in the adjacent lane (in the example illustrated in the drawing, the other vehicle m2) will be referred to as a front reference vehicle, and another vehicle running immediately behind the lane change target position TAs in the adjacent lane (in the example illustrated in the drawing, the other vehicle m3) will be referred to as a rear reference vehicle.

When the lane change target position TAs is set, the target trajectory generator 144 generates a plurality of candidates for a target trajectory for changing the lane of the subject vehicle M. In the example illustrated in FIG. 5, the target trajectory generator 144 assumes that each of another vehicle m1 that is a vehicle running ahead, the other vehicle m2 that is a front reference vehicle, and the other vehicle m3 that is a rear reference vehicle runs in accordance with a predetermined speed model and generates a plurality of candidates for a target trajectory on the basis of speed models of these three vehicles and a speed of a subject vehicle M such that the subject vehicle M does not interfere with the other vehicle m1 and is present at a lane change target position TAs between the other vehicle m2 and the other vehicle m3 at a certain time in the future.

For example, the target trajectory generator 144 smoothly connects from a current position of the subject vehicle M to a position of the other vehicle m2 at a certain time in the future, the center of a lane that is a lane change destination, and an end point of the lane change using a polynomial curve such as a spline curve and arranges a predetermined number of locus points K at equal intervals or unequal intervals on this curve. At this time, the target trajectory generator 144 generates a plurality of candidates for a target trajectory such that at least one locus point K is disposed within the lane change target position TAs.

Then, the target trajectory generator 144 selects an optimal target trajectory among the plurality of generated candidates for the target trajectory. The optimal target trajectory, for example, is a target trajectory in which a yaw rate, which is predicted to be generated when the subject vehicle M is caused to run on the basis of the target trajectory, is lower than a threshold, and a speed of the subject vehicle M is within a predetermined speed range. The threshold of the yaw rate, for example, is set to a yaw rate of a degree at which an excessive load (an acceleration in the vehicle width direction becomes equal to or higher than a threshold) is not generated for a vehicle occupant when a lane change is performed. The predetermined speed range, for example, is set to a speed range of about 70 to 110 [km/h].

When the lane change target position TAs is set, and a target trajectory for changing the lane of the subject vehicle M to the lane change target position TAs is generated, the target trajectory generator 144 determines whether or not a lane change to the lane change target position TAs (in other words, between the other vehicle m2 and the other vehicle m3) can be performed.

For example, the target trajectory generator 144 sets a prohibition area RA prohibiting the presence of another vehicle in the adjacent lane L2, and in a case in which not even a part of another vehicle is present in the prohibition area RA, and each time-to-collision (TTC) between the subject vehicle M and the other vehicle m2 and the other vehicle m3 is longer than a threshold, it is determined that lane change can be performed. This determination condition is one example in a case in which a lane change target position TAs is set on a lateral side of the subject vehicle M.

As illustrated in FIG. 6, for example, the target trajectory generator 144 projects the subject vehicle M to a lane L2 that is a lane change destination and sets a prohibition area RA having a predetermined margin distance in front of and behind the prohibition area. The prohibition area RA is set as an area extending from one end to the other end of the lane L2 in the horizontal direction (direction Y).

In a case in which no other vehicle is present inside the prohibition area RA, for example, the target trajectory generator 144 sets a virtual extension line FM and a virtual extension line RM acquired by extending a front end and a rear end of the subject vehicle M on the side of the lane L2 that is a lane change destination. The target trajectory generator 144 calculates a time-to-collision TTC(B) between the extension line FM and the other vehicle m2 and a time-to-collision TTC(C) between the extension line RM and the other vehicle m3. The time-to-collision TTC(B) is a time derived by dividing a distance between the extension line FM and the other vehicle m2 by a relative speed between the subject vehicle M and the other vehicle m2. The time-to-collision TTC(C) is a time derived by dividing a distance between the extension line RM and the other vehicle m3 by a relative speed between the subject vehicle M and the other vehicle m3. In a case in which the time-to-collision TTC(B) is longer than a threshold Th(B), and the time-to-collision TTC(C) is longer than a threshold Th(C), the target trajectory generator 144 determines that a lane change can be performed. The thresholds Th(B) and Th(C) may be either the same values or different values.

In a case in which it is determined that a lane change cannot be performed, the target trajectory generator 144 newly selects two other vehicles among a plurality of other vehicles running in the adjacent lane L2 and resets a lane change target position TAs between the two other vehicles that have newly been selected. One vehicle out of the two other vehicles that have been newly selected may be another vehicle that has been selected a previous time.

The target trajectory generator 144 repeats setting of a lane change target position TAs until it is determined that a lane change can be performed. At this time, the target trajectory generator 144 may generate a target trajectory for causing the subject vehicle M to wait in the own lane L1 or generate a target trajectory for deceleration or acceleration for moving the subject vehicle M to the lateral side of the lane change target position TAs in the own lane L1.

In a case in which it is determined that lane change can be performed, the target trajectory generator 144 outputs information representing the generated target trajectory to the second controller 160 and the third controller 170.

[Process of Third Controller Based on Lane Changing Event]

Next, a specific example of the process of the third controller 170 in a situation in which the subject vehicle M is caused to change lanes in accordance with a lane changing event will be described. In the following description, a situation in which a subject vehicle M performs different driving control on the basis of states of the subject vehicle M and other nearby vehicles will be described.

<First Situation; Time t0>

Figure 7:
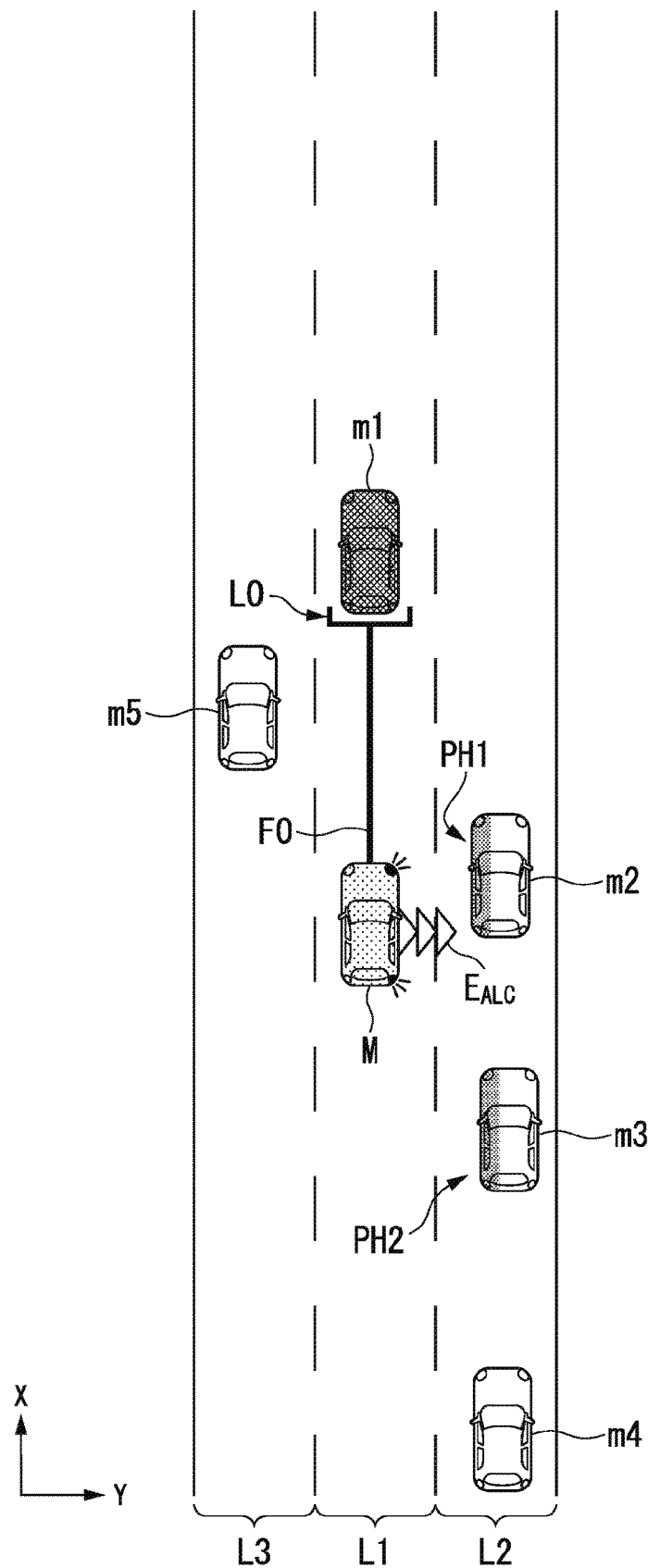
FIG. 7 is a diagram illustrating a state of the vicinity of a subject vehicle M at a time t0 in a first situation together with an image generated by an HMI controller.
Figure 8:
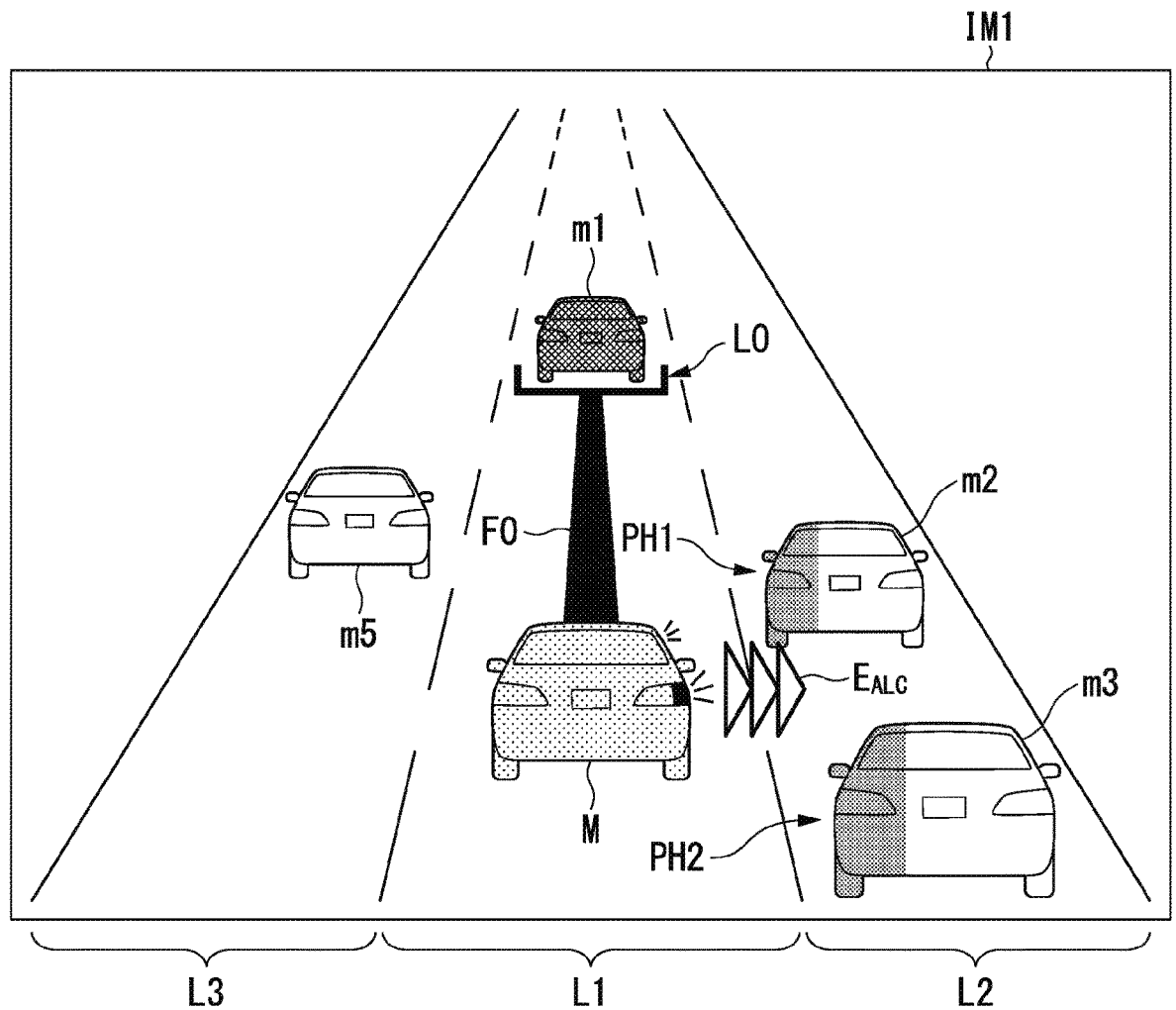
FIG. 8 is a diagram illustrating one example of an image displayed on a second display in the state of the vicinity of the subject vehicle illustrated in FIG. 7.

A first situation is a situation in which the subject vehicle M plans a lane changing event in automated driving control up to a destination, and after allowing another vehicle running adjacent to the subject vehicle M to run first in a lane that is a lane change destination, performs a lane change. FIG. 7 is a diagram illustrating a state of the vicinity of a subject vehicle M at a time t0 in the first situation together with an image generated by the HMI controller 174. FIG. 8 is a diagram illustrating one example of an image IM1 displayed on the second display 32B in the state of the vicinity of the subject vehicle illustrated in FIG. 7. The time t0, for example, represents a time at which the running form of the subject vehicle M changes from following run to lane changing. In the following description, it is assumed that times t0 to t3 satisfy a relation of t0<t1<t2<t3. At the time t0, it is assumed that the subject vehicle M runs in a lane L1, and another vehicle m1 is a vehicle running ahead that runs in front of the subject vehicle M in the same lane. Other vehicles m2 to m4 are vehicles running in a lane L2 adjacent to the right side of the lane L1, and another vehicle m5 is a vehicle running in a lane L3 adjacent to the left side of the lane L1.

In this situation, the HMI controller 174 generates an image IM1 including an image resembling a road on the basis of information (for example, a recognition result and a target trajectory) acquired by the second acquirer 172. More specifically, the HMI controller 174 generates a lane image resembling lanes L1 to L3 included in a road. The HMI controller 174 displays a subject vehicle image and other vehicle images resembling the other vehicles m1 to m5 in the second display 32B superimposed on each running lane of the lane image. In this case, the HMI controller 174 may adjust the sizes of the other vehicle images of the other vehicles m1 to m5 on the basis of relative position relations thereof from the subject vehicle M. The HMI controller 174 may change the shapes of the other vehicle images on the basis of vehicle shapes of the other vehicles m1 to m5 recognized by the object recognizing device 16. For example, in a case in which a shape of another vehicle is recognized as being a shape of a bus, a large truck, or the like by the object recognizing device 16, an image of the other vehicle corresponding to the shape is displayed. The HMI controller 174 may not include the subject vehicle image in the image IM1.

At the time t0, a target trajectory for lane change has not been generated yet. For this reason, the HMI controller 174, similar to the examples illustrated in FIGS. 7 and 8, displays a target trajectory image for following another vehicle m1 and displays an object image representing a lane change (hereinafter referred to as a lane-change-representing image $E_{ALC}$) according to automated driving control. An object image is one element (a part) of each layer image. The HMI controller 174 may set a display form of the lane-change-representing image $E_{ALC}$ to be different between a case in which the subject vehicle waits for a state in which the subject vehicle can move to a lane that is a lane change destination and a case of a state in which a lane change can be performed or a state in which a lane change is being performed. In the examples illustrated in FIGS. 7 and 8, a lane-change-representing image $E_{ALC}$ having a frame shape (an outline shape) representing a waiting state is displayed. The HMI controller 174 may generate an image in which a right-turn indicator of the subject vehicle M is turned on and off together with the lane-change-representing image $E_{ALC}$ and display the generated image to be superimposed on the subject vehicle image.

The HMI controller 174 determines another vehicle m1 (one example of a first vehicle) that is a following target having an influence on the behavior of the subject vehicle M to be a lock-on vehicle on the basis of a result of recognition acquired by the recognizer 130. Then, the HMI controller 174 displays an image (first image) resembling the lock-on vehicle among other vehicle images with a tone (a tone and shading of brightness and saturation and the like) that is brighter than those of images resembling other vehicles m2 to m5. For example, the HMI controller 174 may emphasize a lock-on vehicle by relatively decreasing the brightness of the vehicles other than the lock-on vehicle by about 50 [%] relative to that of the lock-on vehicle.

The HMI controller 174 may display an object image representing that the subject vehicle M is following the lock-on vehicle (hereinafter referred to as a lock-on-representing image LO) at a position associated with the lock-on vehicle (for example, near the lock-on vehicle). In the examples illustrated in FIGS. 7 and 8, a U-shaped object image is displayed at the rear end of another vehicle m1 that is a lock-on vehicle as a lock-on-representing image LO. In this way, the HMI controller 174 displays the lock-on vehicle with a tone brighter than those of the other vehicles and displays the lock-on-representing image LO at the rear end of the lock-on vehicle. Accordingly, when seen by a vehicle occupant, the lock-on vehicle is visually recognized with more emphasis than the other vehicles.

The HMI controller 174 displays an object image representing that the subject vehicle M is following the lock-on vehicle (hereinafter referred to as a following-representing image FO). The following-representing image FO is one example of a target trajectory image. In the example illustrated in the drawing, the following-representing image FO is displayed such that the lock-on-representing image LO and the subject vehicle image are connected.

The HMI controller 174 recognizes other vehicles m2 to m4 having influences on the generation of a target trajectory for performing lane change from the lane L1 to the lane L2 as second vehicles on the basis of a result of recognition acquired by the recognizer 130. Then, the HMI controller 174 displays images resembling the second vehicles (second images) with more emphasis than images (third images) resembling third vehicles (other vehicles m4 and m5) other than the first vehicle and the second vehicles. More specifically, the HMI controller 174 displays the first image with more emphasis than the second images and displays the second images with more emphasis than the third images.

In a case in which a second image is displayed with emphasis, the HMI controller 174 displays an image representing a direction in which the lane change of the subject vehicle M is disturbed in association with the second image. For example, the HMI controller 174 displays an image area, which is disposed on a left-side face close to the subject vehicle M side, of the other vehicle image resembling each of the other vehicles m2 and m3 with more emphasis than the other area as an image representing a direction in which the lane change is disturbed. Here, the emphasized display includes displaying a highlight image of a predetermined color to be superimposed with predetermined transmittance in association with an other vehicle image. In the examples illustrated in FIGS. 7 and 8, by using the HMI controller 174, a partial highlight image PH1 is displayed on a left-side face of an image resembling the other vehicle m2 in a superimposed manner, and a partial highlight image PH2 is displayed on a left-side face of an image resembling the other vehicle m3 in a superimposed manner. Since the other vehicles m2 and m3 have no influence on the current running of the subject vehicle M (in other words, there is no change in the behavior of the subject vehicle M), areas of the images resembling the other vehicles m2 and m3 other than the areas of the highlight images PH1 and PH2 are displayed in the same display form as that of the third images. By performing a partial emphasis display, a vehicle occupant can be allowed to perceive that driving control is executed in a state detected by a sensor fusion process of the vehicle system 1 in more detail.

The HMI controller 174 continues the emphasized display of the first image until the first vehicle has no influence on the behavior of the subject vehicle M and continues the emphasized display of the second images until the second vehicles have no influence on the behavior of the subject vehicle M.

<First Situation; Time t1>

Figure 9:
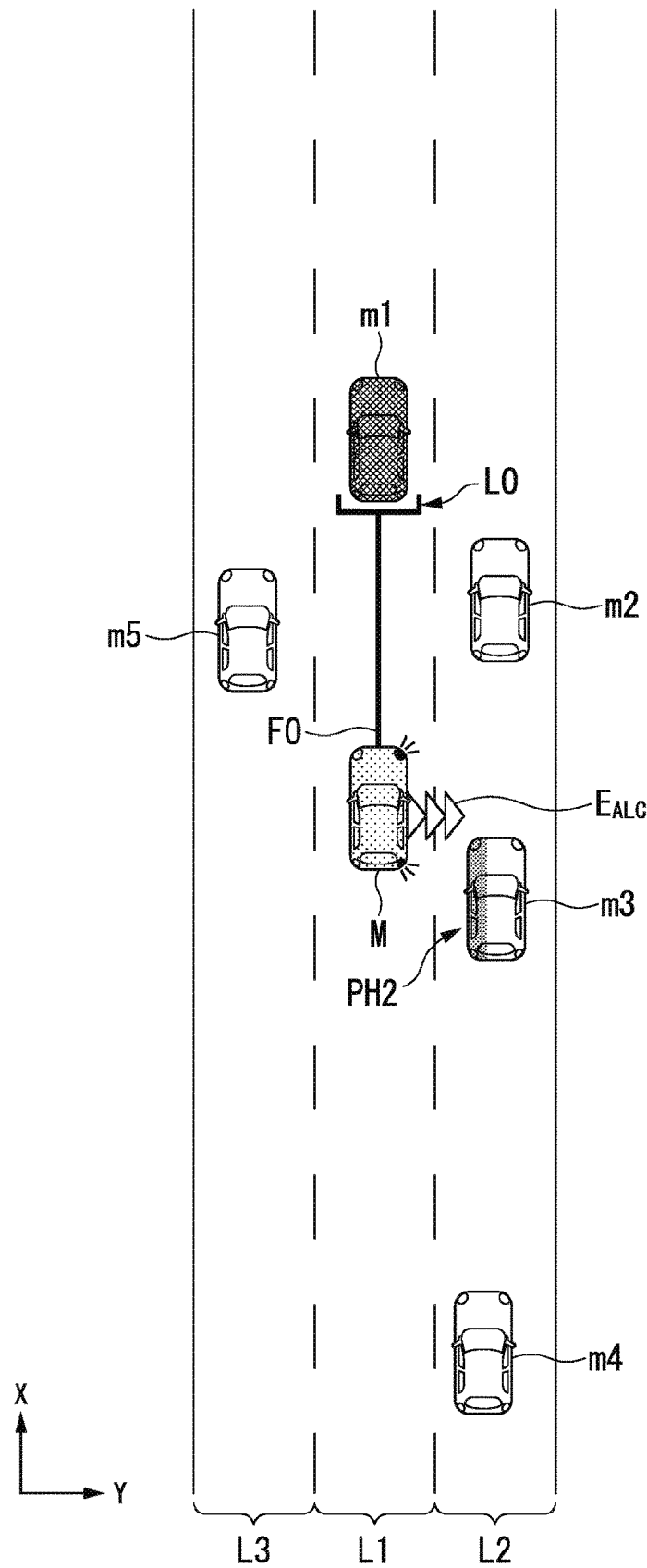
FIG. 9 is a diagram illustrating a state of the vicinity of a subject vehicle M at a time t1 in the first situation together with an image generated by the HMI controller.
Figure 10:
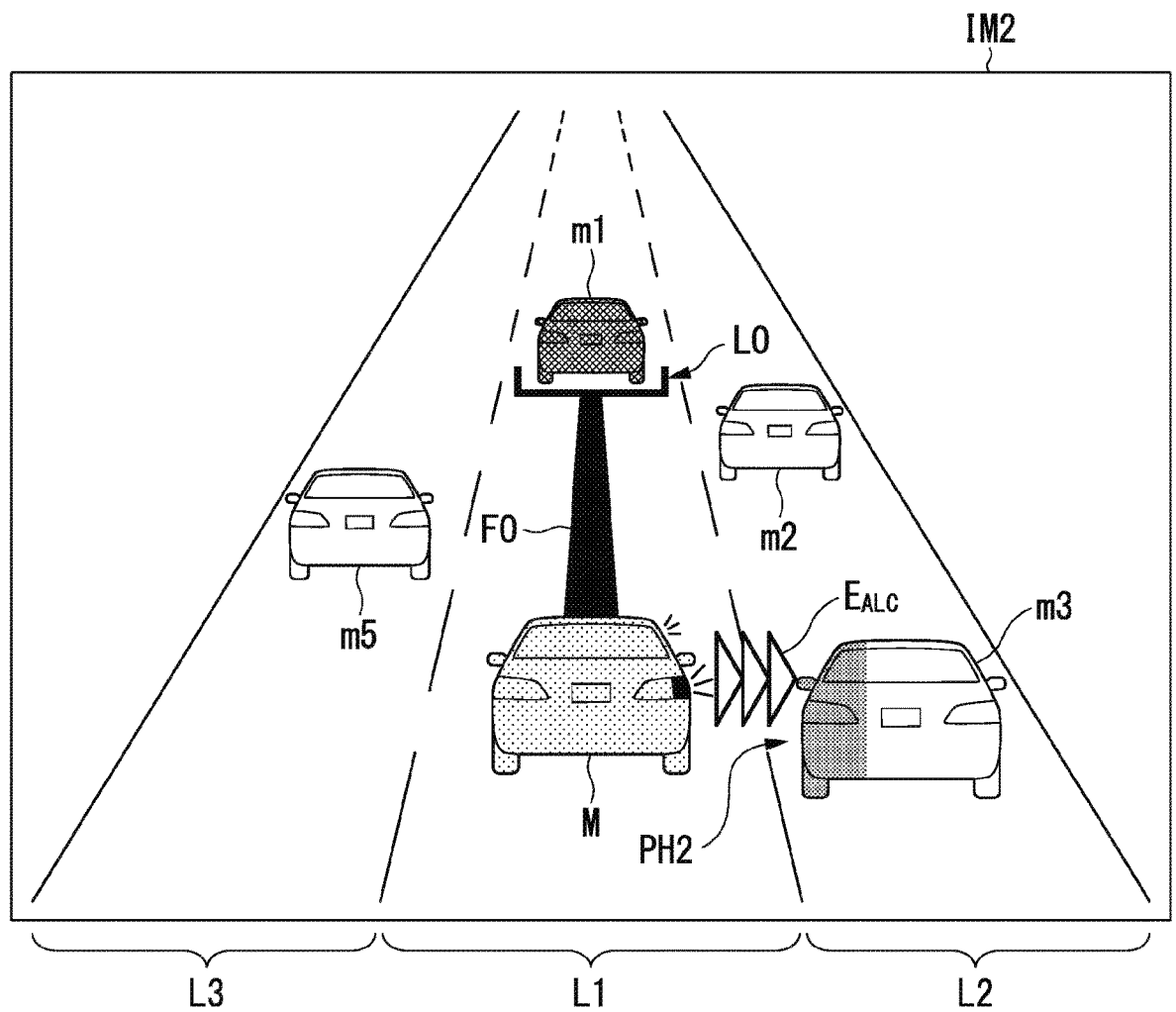
FIG. 10 is a diagram illustrating one example of an image displayed on the second display in a state of the subject vehicle M illustrated in FIG. 9.

FIG. 9 is a diagram illustrating a state of the vicinity of a subject vehicle M at a time t1 in the first situation together with an image generated by the HMI controller 174. FIG. 10 is a diagram illustrating one example of an image IM2 displayed on the second display 32B in the state of the subject vehicle M illustrated in FIG. 9. In the example illustrated in FIG. 9, the target trajectory generator 144 sets a lane change target position TAs in a section between other vehicles m2 and m3 and determines whether or not a lane change can be performed on the basis of relative positions and relative speeds between the other vehicles m2 and m3 and the subject vehicle M. The examples illustrated in FIGS. 9 and 10 illustrate a case in which a lane change cannot be performed. In this case, the HMI controller 174 ends the display of the highlight image PH2 for the image resembling the other vehicle m2 that is determined to have no likelihood of coming in contact with the subject vehicle M and is estimated not to be a factor disturbing the locus of the subject vehicle M on the basis of a relative position and a relative speed between the other vehicle m2 and the subject vehicle M. In addition, the HMI controller 174 continuously displays the highlight image PH2 for the image resembling the other vehicle m3 that is determined to have a likelihood of coming in contact with the subject vehicle M in a case in which the subject vehicle M performs a lane change on the basis of a relative position and a relative speed between the other vehicle m3 and the subject vehicle M.

<First Situation; Time t2>

Figure 11:
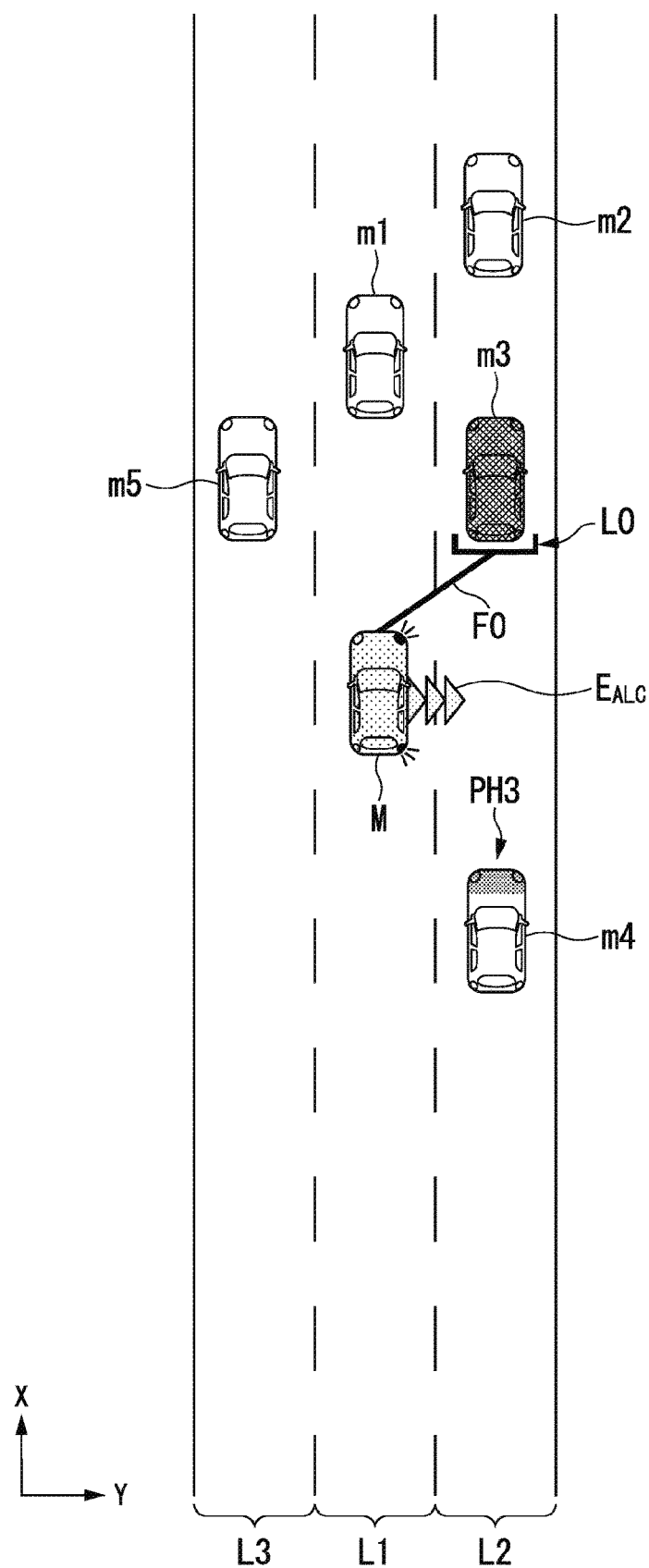
FIG. 11 is a diagram illustrating a state of the vicinity of a subject vehicle M at a time t2 in the first situation together with an image generated by the HMI controller.
Figure 12:
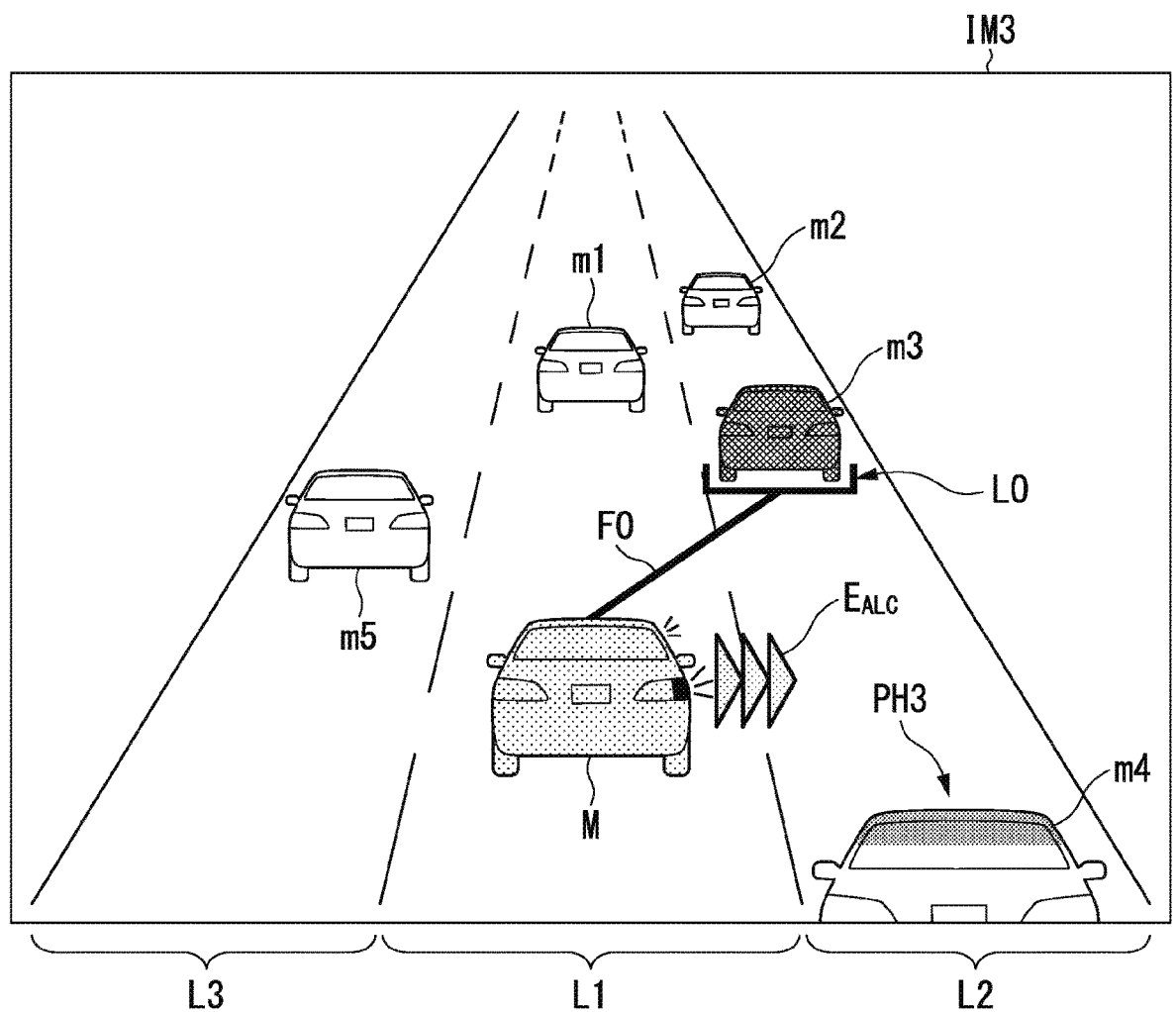
FIG. 12 is a diagram illustrating one example of an image displayed on the second display in a state of the subject vehicle M illustrated in FIG. 11.

FIG. 11 is a diagram illustrating a state of the vicinity of a subject vehicle M at a time t2 in the first situation together with an image generated by the HMI controller 174. FIG. 12 is a diagram illustrating one example of an image IM3 displayed on the second display 32B in the state of the subject vehicle M illustrated in FIG. 11. The examples illustrated in FIGS. 11 and 12 illustrate a state in which the target trajectory generator 144 sets a lane change target position TAs in a section between other vehicles m3 and m4 and determines whether or not a lane change can be performed on the basis of relative positions and relative speeds between the other vehicles m3 and m4 and the subject vehicle M, and it is determined that a lane change can be performed, and the lane change is started.

In this case, the HMI controller 174 displays an image resembling a vehicle m3 that is a following target vehicle after the lane change with more emphasis than the other vehicles m1, m2, m4, and m5 as a first image. The HMI controller 174 displays a lock-on-representing image LO and a following-representing image FO at a position associated with an image resembling the other vehicle m3. Since the vehicle m1 becomes a vehicle not having an influence on the action of the subject vehicle M, the HMI controller 174 ends the emphasis display and displays the image corresponding thereto as a third image. In this way, the HMI controller 174 can allow a vehicle occupant to easily visually recognize that the other vehicle m1 has no influence on the behavior of the subject vehicle M.

At the time t2, a highlight image PH3 is displayed superimposed on an area close to the subject vehicle M of a part of an image resembling the vehicle m4 having a high likelihood of coming in contact with the subject vehicle M. In the examples illustrated in FIGS. 11 and 12, the highlight image PH3 is displayed at a position associated with a front end portion of the other vehicle m4.

In a case in which the behavior of the subject vehicle M accompanying the lane change changes, the HMI controller 174 changes the display form of the lane-change-representing image $E_{ALC}$. In the examples illustrated in FIGS. 11 and 12, a lane-change-representing image $E_{ALC}$ acquired by coloring the inside of the entire range of the lane-change-representing image $E_{ALC}$ in a predetermined color is displayed. In this way, the HMI controller 174 can allow a vehicle occupant to easily perceive that a lane changing event is executed, and the behavior of the subject vehicle M has been changed or is changing.

<First Situation; Time t3>

Figure 13:
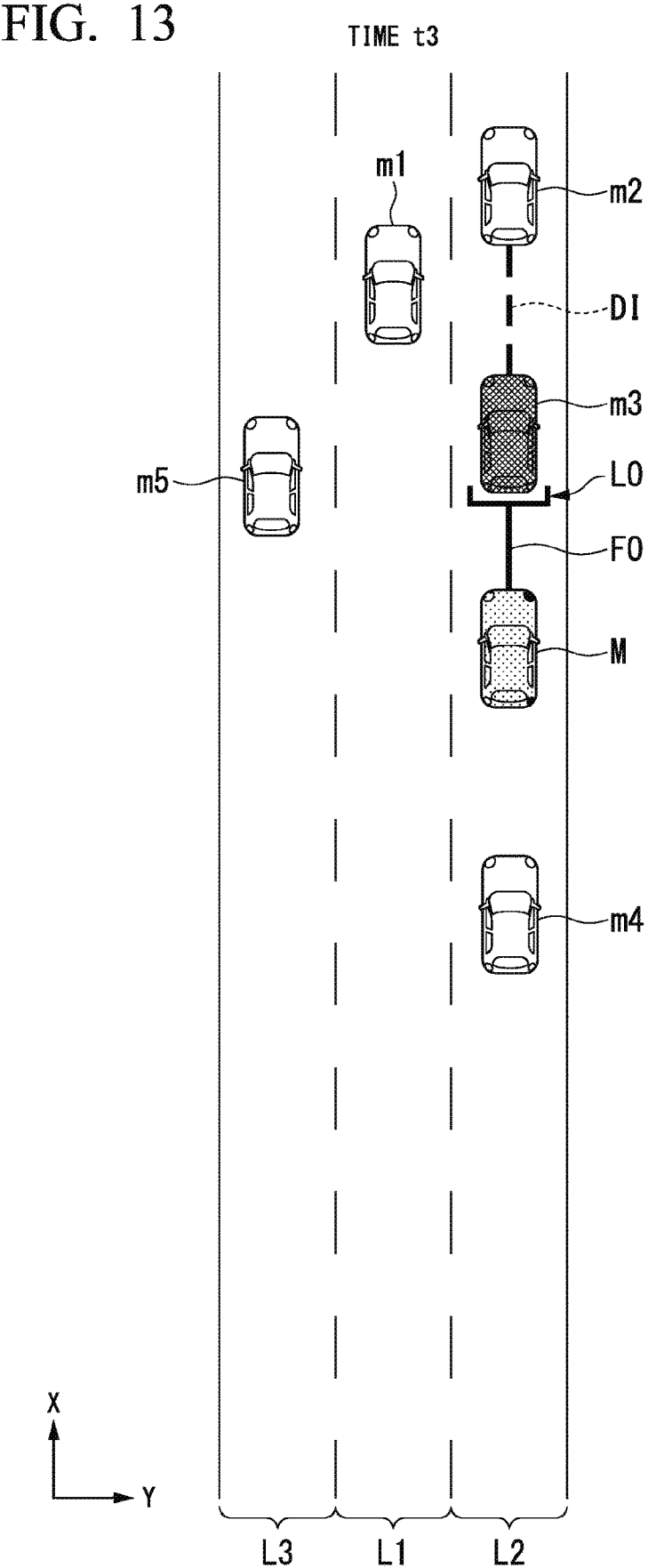
FIG. 13 is a diagram illustrating a state of the vicinity of a subject vehicle M at a time t3 in the first situation together with an image generated by the HMI controller.
Figure 14:
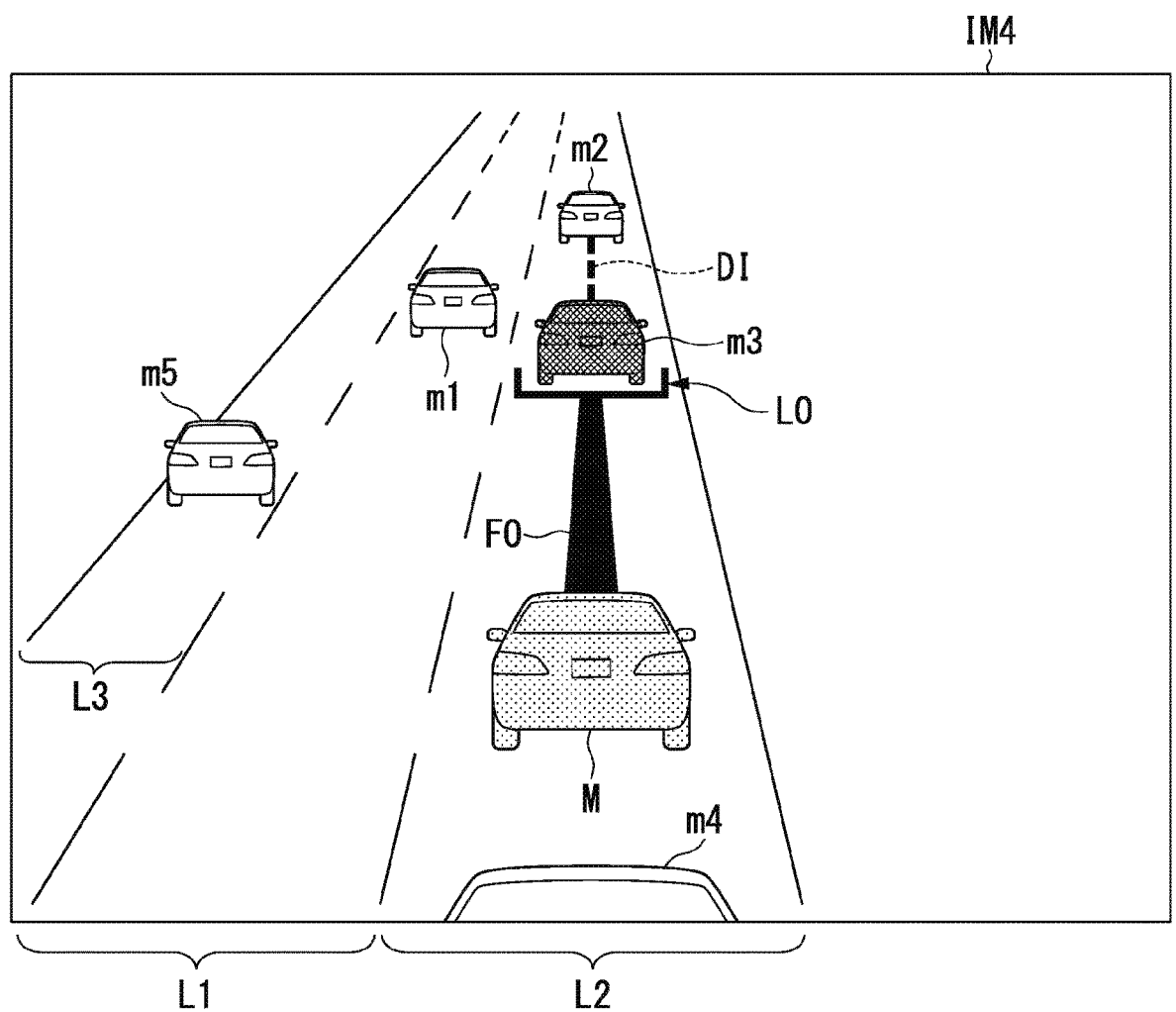
FIG. 14 is a diagram illustrating one example of an image displayed on the second display in a state of the subject vehicle M illustrated in FIG. 13.

FIG. 13 is a diagram illustrating a state of the vicinity of a subject vehicle M at a time t3 in the first situation together with an image generated by the HMI controller 174. FIG. 14 is a diagram illustrating one example of an image IM4 displayed on the second display 32B in the state of the subject vehicle M illustrated in FIG. 13. The examples illustrated in FIGS. 13 and 14 illustrate a state in which the subject vehicle M has completed a lane change from a lane L1 to a lane L2. In this case, the HMI controller 174 generates an image IM4 including an image of a road shape in which a lane L2, in which the subject vehicle M is running, is at the center. The HMI controller 174 displays another vehicle m3 that is a following vehicle with more emphasis than the other vehicles m1, m2, m4, and m5.

The HMI controller 174 displays a lock-on-representing image LO and a following-representing image FO in association with an image resembling the other vehicle m3. In addition, the HMI controller 174 may display an image representing an advancement direction of the subject vehicle M disposed on the inner side of the other vehicle m3 that is the lock-on vehicle when seen from the subject vehicle M (hereinafter referred to as an advancement-direction-representing image DI). The advancement-direction-representing image DI is one example of a target trajectory image. In this case, the HMI controller 174 may display the advancement-direction-representing image DI in a display form different from the display form of the following-representing image FO. In the examples illustrated in FIGS. 13 and 14, the following-representing image FO is denoted using a solid line, and the advancement-direction-representing image DI is denoted using a dotted line. In this way, the HMI controller 174 can allow a vehicle occupant to easily visually recognize a vehicle that the subject vehicle M is following and the advancement direction of the subject vehicle M.

In this way, the HMI controller 174 causes a vehicle occupant to visually recognize other vehicles recognized by the vehicle system 1 and to perceive other vehicles having direct influences on the behavior of the subject vehicle M and other vehicles having influences on the generation of an action plan in a distinguishable manner. As a result, a secure feeling can be provided for a vehicle occupant. The HMI controller 174, in the first situation, may generate images similar to those illustrated in FIGS. 7, 9, 11, and 13 and display the generated images in the display device 32.

<Second Situation>

A second situation is a situation in which a subject vehicle M plans a lane changing event in automated driving control up to a destination and, in a lane that is a lane change destination, overtakes another vehicle running adjacently to the subject vehicle M and performs lane change. In the description of the second situation, a state of the vicinity of the subject vehicle M at each time will be described together with images generated by the HMI controller 174, and description of images displayed in correspondence with a state of the subject vehicle M will be omitted.

Figure 15:
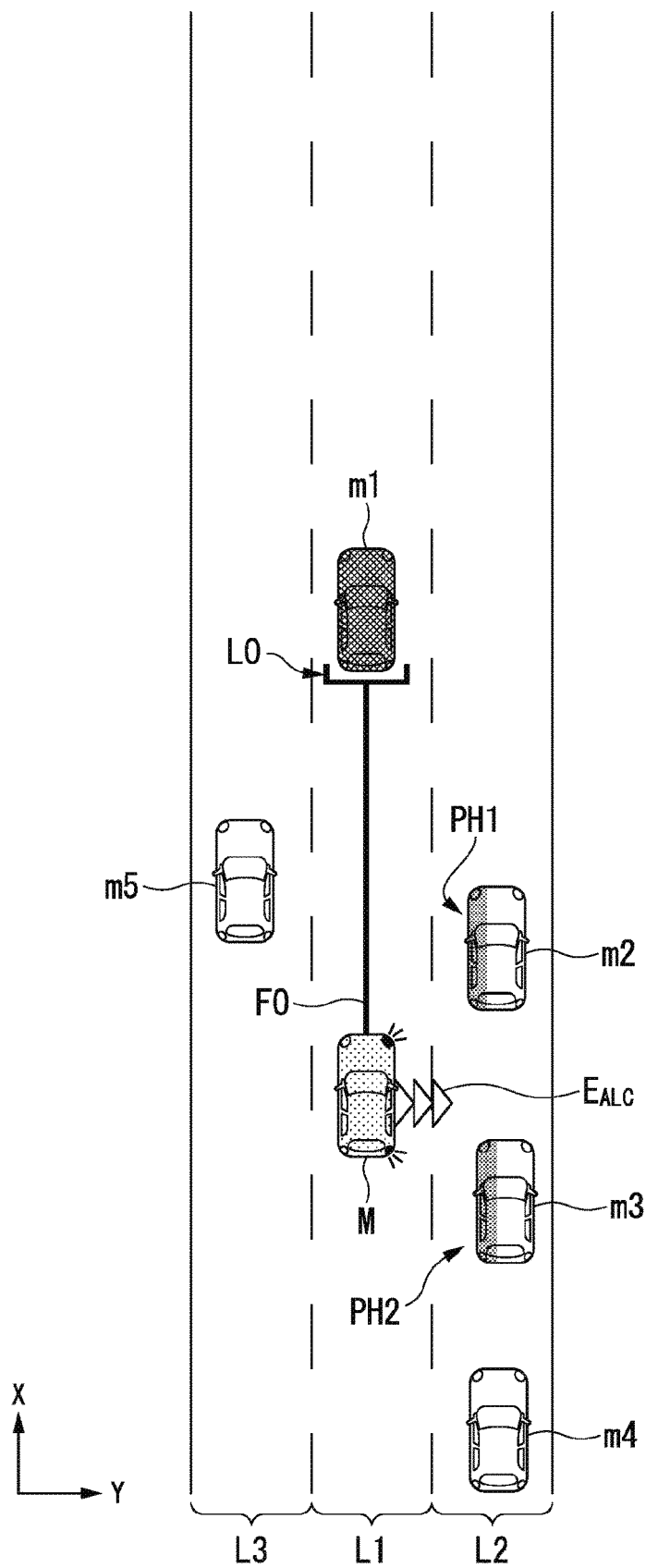
FIG. 15 is a diagram illustrating a state of the vicinity of a subject vehicle M at a time t0 in a second situation together with images generated by an HMI controller.

FIG. 15 is a diagram illustrating a state of the vicinity of a subject vehicle M at a time t0 in the second situation together with images generated by the HMI controller 174. The state of the vicinity of the subject vehicle M at the time t0 in the second situation is similar to the state of the vicinity of the subject vehicle M at the time t0 in the first situation, and thus, detailed description thereof will be omitted.

Here, for example, in a case in which there is a section of a predetermined interval or more between the vehicle m1 and the subject vehicle M, and it is determined that, by accelerating the subject vehicle M within this section, the subject vehicle M can perform lane change by taking over the vehicle m2 on the basis of relations of relative speeds between the subject vehicle and the other vehicles m2 to m4, the action plan generator 140 generates a target trajectory for accelerating the subject vehicle M and causes the subject vehicle M to run along the generated target trajectory.

Figure 16:
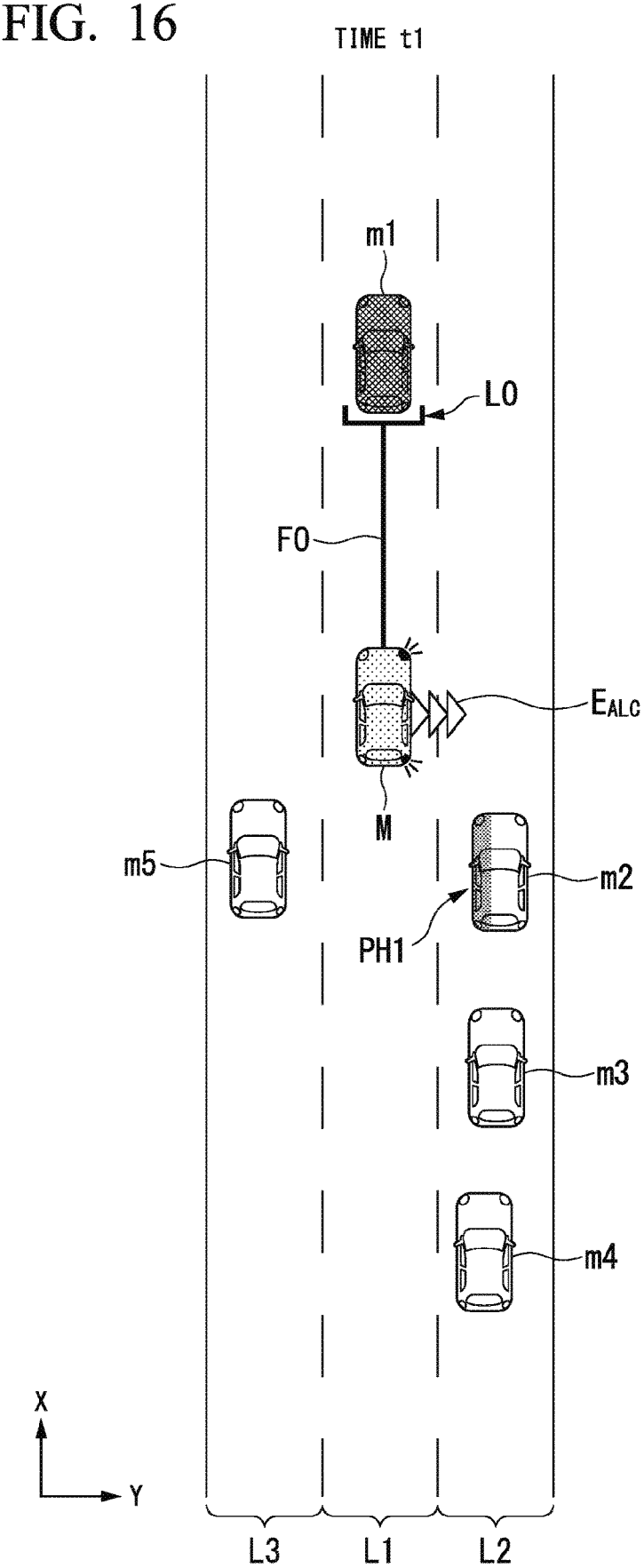
FIG. 16 is a diagram illustrating a state of the vicinity of a subject vehicle M at a time t1 in the second situation together with images generated by the HMI controller.

FIG. 16 is a diagram illustrating a state of the vicinity of a subject vehicle M at a time t1 in the second situation together with images generated by the HMI controller 174. FIG. 16 illustrates a state in which the subject vehicle M at the time t1 has overtaken the other vehicle m2. The HMI controller 174 displays a partial highlight image PH1 on the left-side face of an image resembling the other vehicle m2 present at a position disturbing lane change of the subject vehicle M at the time t1.

Figure 17:
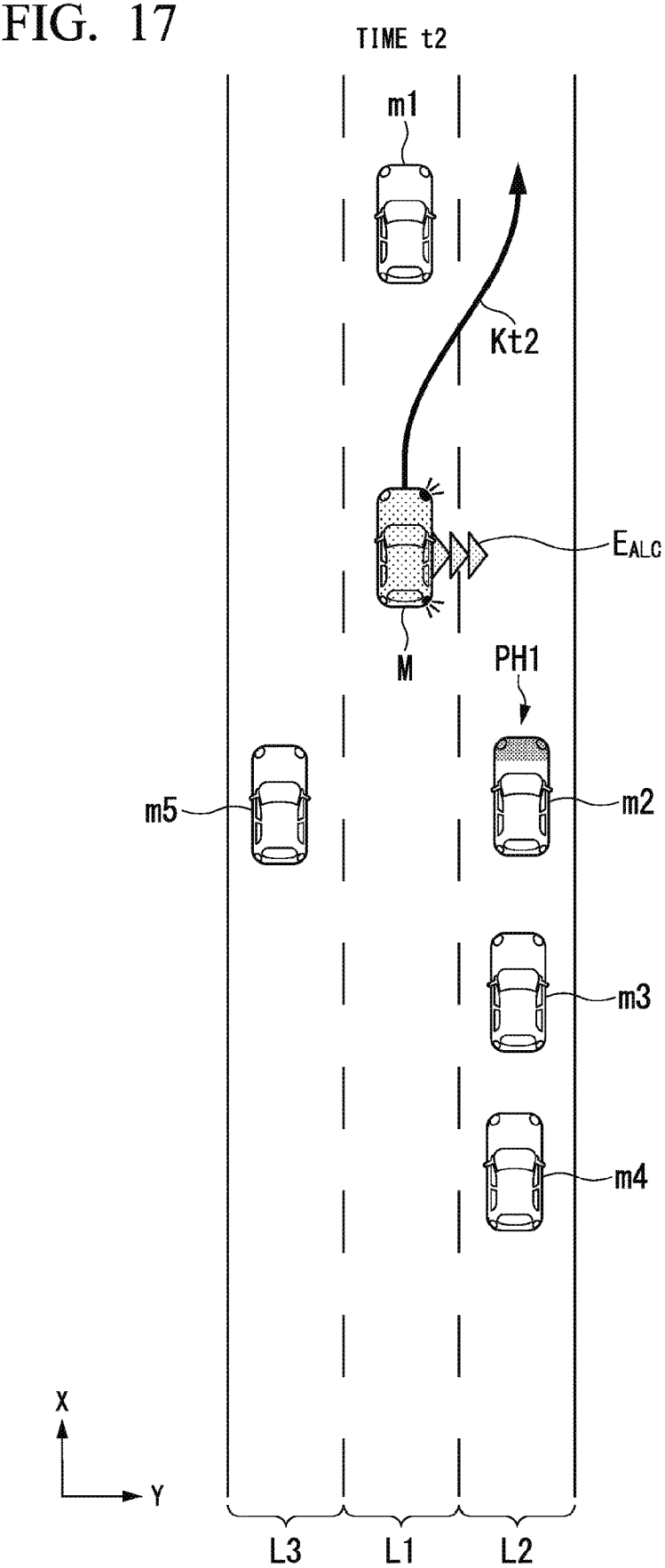
FIG. 17 is a diagram illustrating a state of the vicinity of a subject vehicle M at a time t2 in the second situation together with images generated by the HMI controller.

FIG. 17 is a diagram illustrating a state of the vicinity of a subject vehicle M at a time t2 in the second situation together with images generated by the HMI controller 174.

In the example illustrated in FIG. 17, since there is no vehicle running in front of the subject vehicle M in the lane L2 that is a lane change destination, the target trajectory generator 144 generates a target trajectory for performing lane change in front of another vehicle m1 and causes the subject vehicle M to run along the generated target trajectory. The HMI controller 174 generates a target trajectory image Kt2 resembling the generated target trajectory and displays the generated target trajectory image Kt2 at a position corresponding thereto.

At a time t2, in order for the subject vehicle M to start a lane changing event using the second controller 160, the HMI controller 174 changes the display form of the lane change representing image $E_{ALC}$. The HMI controller 174 changes the display of the partial highlight image PH1 of the other vehicle m2 from the side face to a frontend portion of the other vehicle m2.

Figure 18:
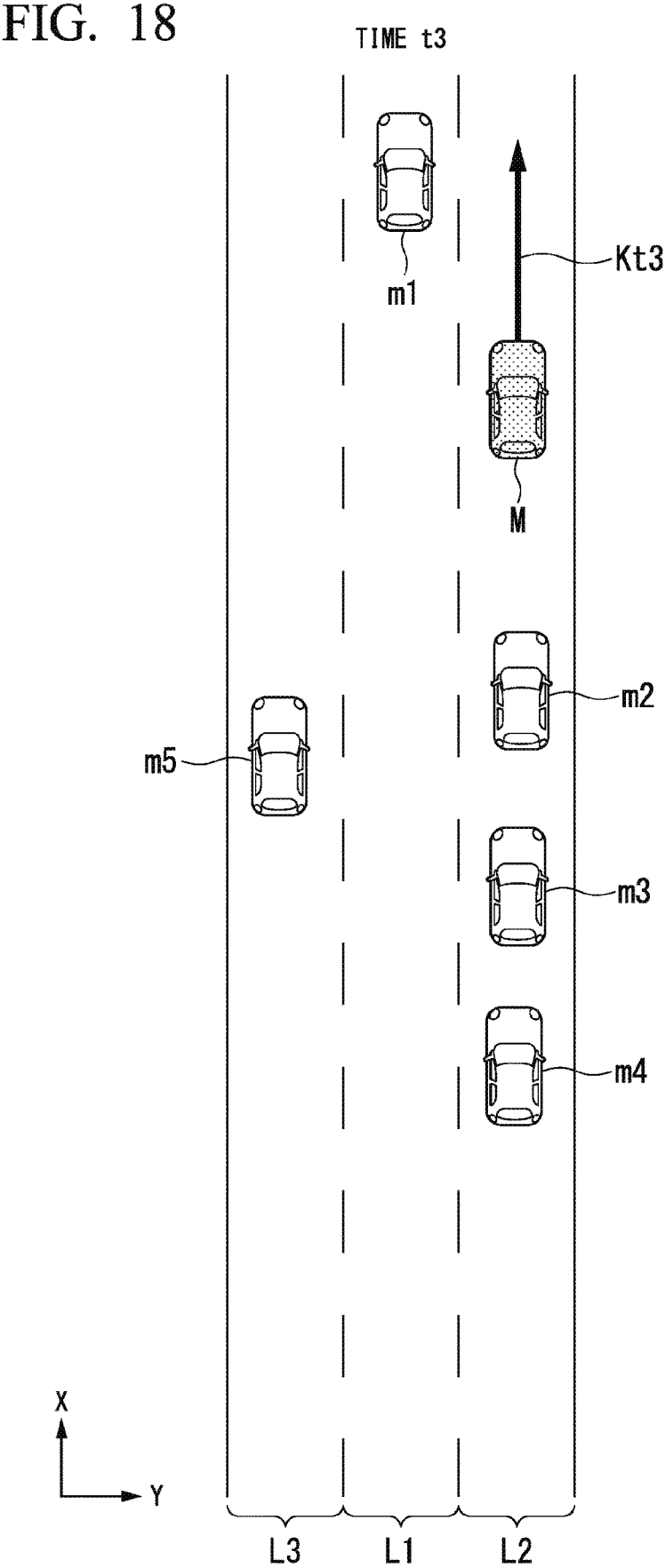
FIG. 18 is a diagram illustrating a state of the vicinity of a subject vehicle M at a time t3 in the second situation together with images generated by the HMI controller.

FIG. 18 is a diagram illustrating a state of the vicinity of a subject vehicle M at a time t3 in the second situation together with images generated by the HMI controller 174. At the time t3 in the second situation, the subject vehicle M has completed the lane changing event and is running on a lane L2. In the example illustrated in FIG. 18, there is no vehicle running in front of the subject vehicle M. For this reason, the HMI controller 174 generates a target trajectory image Kt3 resembling a target trajectory corresponding to an advancement direction of the subject vehicle M and displays the generated image in the second display 32B. Accordingly, also in the second situation, a vehicle occupant can easily visually recognize a vehicle that the subject vehicle M follows and the advancement direction of the subject vehicle M.

In the second situation, although a situation in which there is another vehicle in a lane change destination is illustrated, in a case in which there is no other vehicle, lane change is executed on the basis of a target trajectory for performing lane change as represented at the time t2 without performing acceleration driving control at the time t1.

<Modified Example>

For example, the action plan generator 140 may perform inter-vehicle communication with other vehicles present near the subject vehicle M using the communication device 20 and perform driving control of the subject vehicle M on the basis of states (for example, changes in the behavior) of the other vehicles and the like acquired through communication. In such a case, the HMI controller 174 may display an image indicating that driving control for changing the behavior of the subject vehicle M has been executed on the basis of the states of the other vehicles in the second display 32B.

Figure 19:
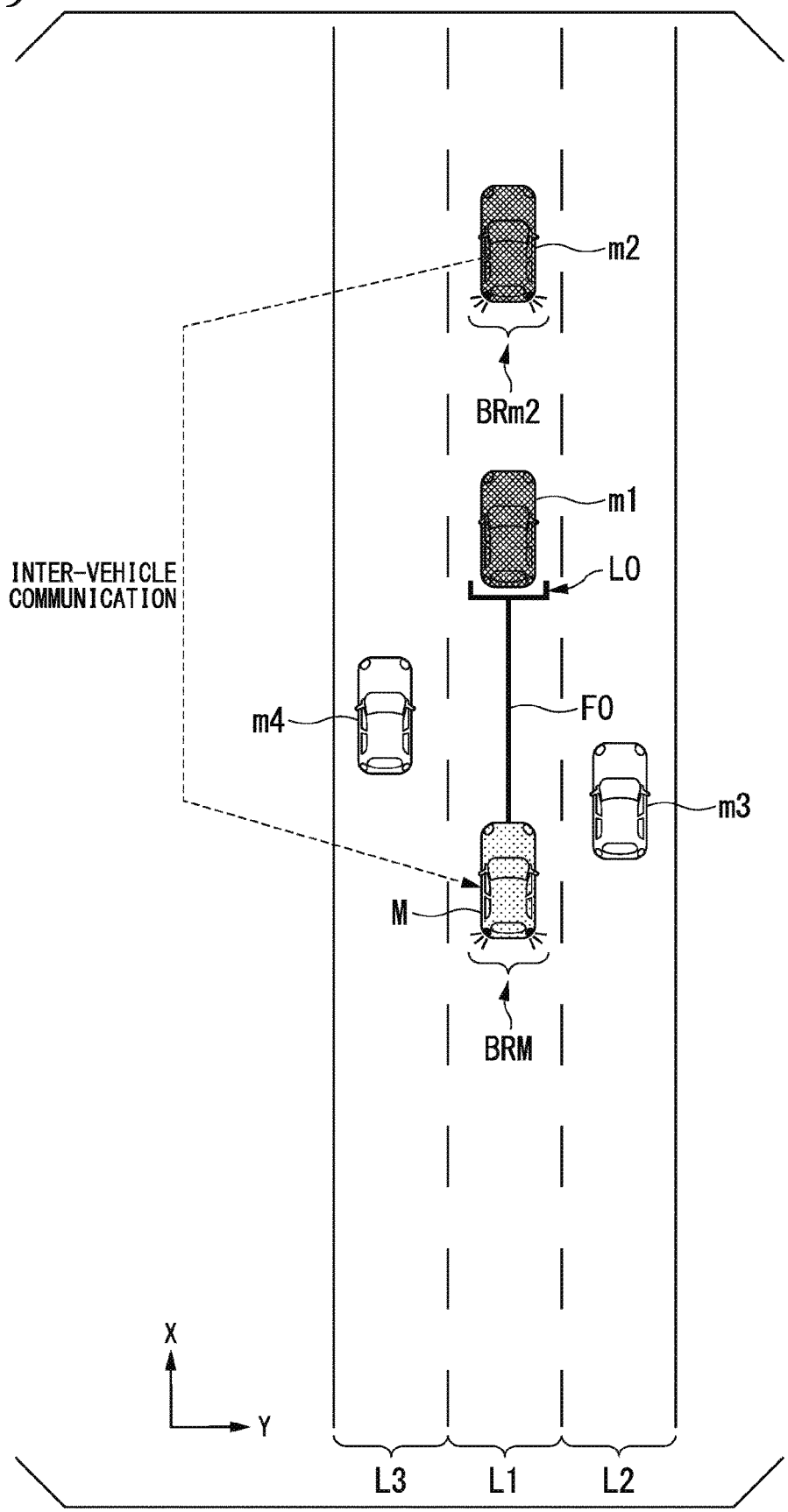
FIG. 19 is a diagram illustrating a view in which driving control of the subject vehicle M is executed on the basis of changes in behaviors of other vehicles acquired through inter-vehicle communication together with an image generated by the HMI controller.
Figure 20:
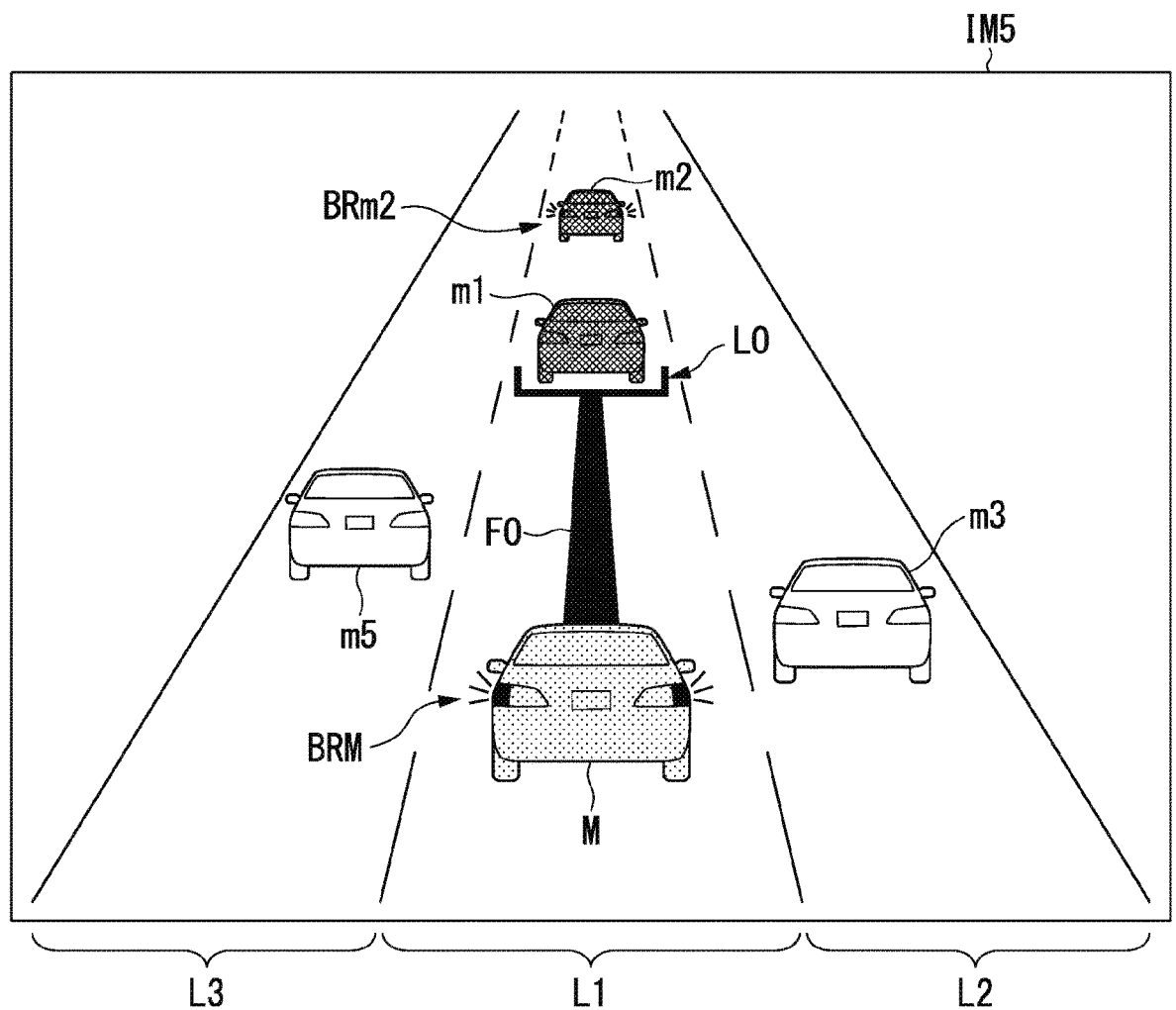
FIG. 20 is a diagram illustrating one example of an image displayed on the second display in the state of the subject vehicle M illustrated in FIG. 19.

FIG. 19 is a diagram illustrating a view in which driving control of the subject vehicle M is executed on the basis of changes in behaviors of other vehicles acquired through inter-vehicle communication together with an image generated by the HMI controller 174. FIG. 20 is a diagram illustrating one example of an image IM5 displayed on the second display 32B in the state of the subject vehicle M illustrated in FIG. 19. In the example illustrated in FIG. 19, it is assumed that the subject vehicle M is running in a lane L1 among lanes L1 to L3 included in a road shape of the vicinity, and another vehicle m1 is a vehicle running ahead running in the same lane as that of the subject vehicle M. In addition, it is assumed that another vehicle m2 is a vehicle that is running in the same lane as that of the subject vehicle M in front of the other vehicle m1 and is in a state in which it is blocked by the other vehicle m1 and cannot be sufficiently visually recognized from a captured image acquired by the camera 10 when seen from the subject vehicle M. It is assumed that another vehicle m3 is a vehicle that is running in the lane L2 that is adjacent to the lane L1 on the right side, and another vehicle m4 is a vehicle that is running in the lane L3 adjacent to the lane L1 on the left side. It is assumed that the other vehicle m2 is a vehicle that can perform inter-vehicle communication with the subject vehicle M. It is assumed that the subject vehicle M is running to follow the other vehicle m1.

It is assumed that the subject vehicle M performs inter-vehicle communication with the other vehicle m2 using the communication device 20 and acquires a state in which the other vehicle m2 has been rapidly decelerated. In this case, the action plan generator 140 generates a target trajectory for decelerating the subject vehicle M before another vehicle m1 that is a vehicle running ahead decelerates and causes the second controller 160 to perform speed control on the basis of the generated target trajectory. In order to clarify a target vehicle for deceleration control, the HMI controller 174 changes the display form of an image resembling the other vehicle m2.

In the examples illustrated in FIGS. 19 and 20, the HMI controller 174 displays another vehicle m1 that the subject vehicle M is following as a first vehicle in a first image and displays a lock-on representing image LO and a following representing image FO in association with an image resembling the other vehicle m1. The HMI controller 174 displays also another vehicle m2 that is a target for deceleration control of the subject vehicle M as a first vehicle having a direct influence on the behavior of the subject vehicle in an emphasized display based on the first image.

While deceleration control of the other vehicle m2 is executed, the HMI controller 174 displays an image BRm2 resembling turning-on of a brake lamp superimposed on an image resembling the other vehicle m2. While the deceleration control of the subject vehicle M is executed, the HMI controller 174 displays an image BRM resembling turning-on of the brake lamp superimposed on an image resembling the subject vehicle M. Accordingly, a vehicle occupant can be allowed to easily visually recognize other vehicles that become causes of the behavior of the subject vehicle M.

The HMI controller 174 may change the display form on the basis of the state of the subject vehicle M also for a lane image and the like instead of (or in addition to) the other vehicle images. For example, in a case in which driving control using the LKAS is executed by using the first controller 120, the HMI controller 174 displays a part or the whole of a lane in which the subject vehicle M is running with more emphasis than the other lanes.

In accordance with an influence of low visibility due to heavy rain or the like, rubbing of a lane, or the like, in a case in which a surrounding road shape of the subject vehicle M recognized by the recognizer 130 cannot be recognized or in a case in which the reliability of recognition of a surrounding road shape is equal to or lower than a threshold, the HMI controller 174 may change the display form of an image resembling the road shape. In such a case, the HMI controller 174 may display an image in which the tone of a lane disposed far away in the advancement direction when seen from the subject vehicle M is lowered. In accordance with an influence of low visibility due to heavy rain or the like, in a case in which surrounding objects of the subject vehicle M cannot be recognized or a case in which the reliability of recognition of surrounding objects is equal to or lower than a threshold, the HMI controller 174 may perform control of increasing transmittance of images of the other vehicles or not displaying the images of the other vehicles as a relative distance from the subject vehicle M increases. In this way, the HMI controller 174 can allow a vehicle occupant to estimate the performance limit of the recognizer 130 from display details. As a result, a vehicle occupant can be allowed to easily perceive a reason for a case in which driving is switched from automated driving to manual driving.

[Process Flow]

Figure 21:
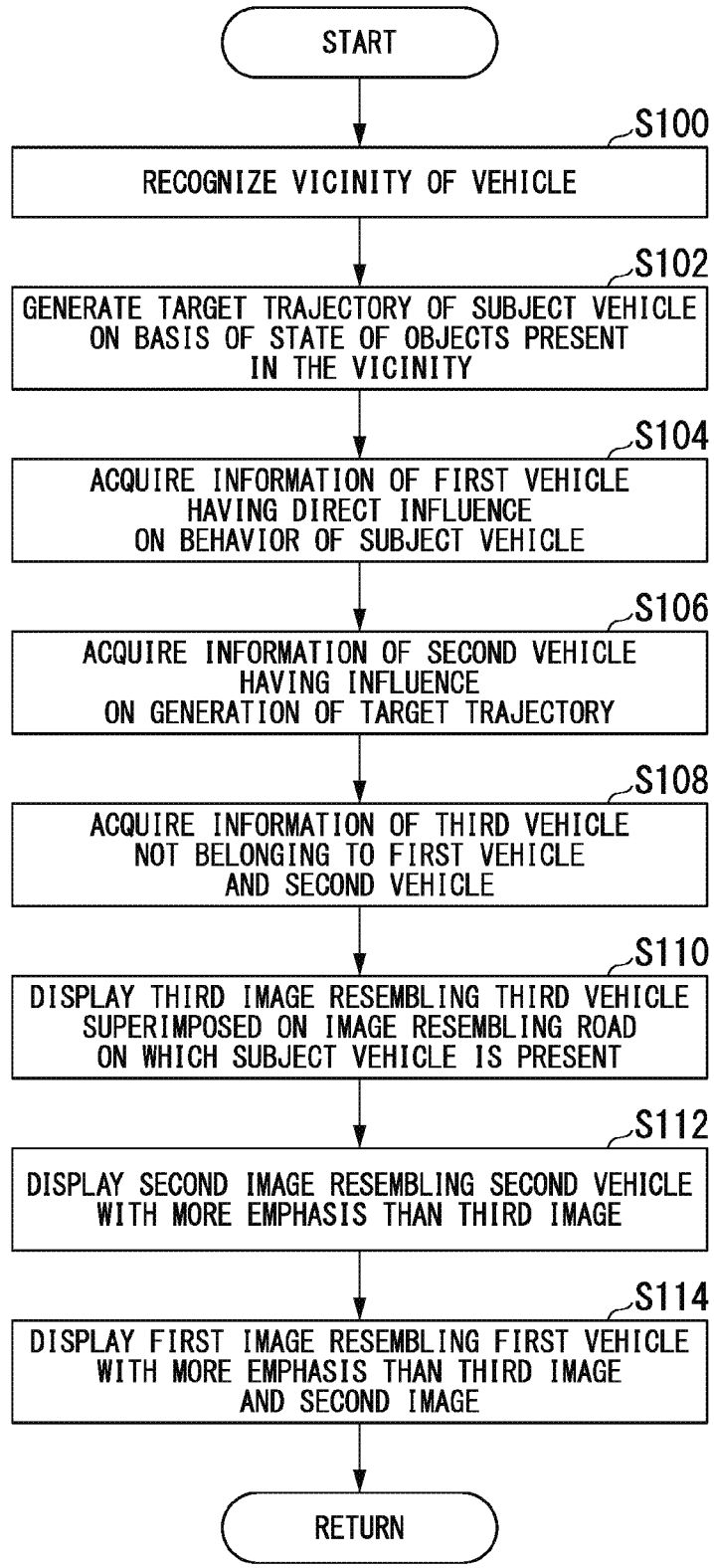
FIG. 21 is a flowchart illustrating one example of the flow of a series of processes performed by an automated driving control device.

Hereinafter, the flow of a series of processes performed by the automated driving control device 100 will be described using a flowchart. FIG. 21 is a flowchart illustrating one example of the flow of a series of processes performed by the automated driving control device 100. In the process illustrated in FIG. 21, a process of controlling display of an image using the HMI controller 174 will be mainly described. The process of this flowchart, for example, may be repeatedly executed at predetermined intervals in automated driving control of the subject vehicle M up to a destination. In the process illustrated in FIG. 21, it is assumed that one or more other vehicles are present in the vicinity of the subject vehicle M.

First, the recognizer 130 recognizes the vicinity of the subject vehicle M (Step S100). Next, the action plan generator 140 generates a target trajectory of the subject vehicle M based on a path to a destination on the basis of states of objects present in the vicinity recognized by the recognizer 130 (Step S102). Next, the HMI controller 174 acquires information of a first vehicle having a direct influence on the behavior of the subject vehicle M from the action plan generator 140 among other vehicles present near the subject vehicles M recognized by the recognizer 130 (Step S104).

Next, the HMI controller 174 acquires information of second vehicles having influences on the generation of a target trajectory of the subject vehicle M among other vehicles present near the subject vehicle M recognized by the recognizer 130 (Step S106). Next, the HMI controller 174 acquires information of third vehicles not belong to the first vehicle and the second vehicles among other vehicles present near the subject vehicle M recognized by the recognizer 130 (Step S108).

Next, the HMI controller 174 displays third images resembling the third vehicles in the display device 32 superimposed on an image resembling a road on which the subject vehicle M is present (Step S110). Next, the HMI controller 174 displays the second images resembling the second vehicles with more emphasis than the third images (Step S112). Next, the HMI controller 174 displays the first image resembling the first vehicle in the display device 32 with more emphasis than the third images and the second images (Step S114).

In this way, the process of this flowchart ends.

According to the embodiment described above, the display device 32 that displays images, the recognizer 130 that recognizes objects including other vehicles present in the vicinity of the subject vehicle M, the automated driving control device 100 that generates a target trajectory of the subject vehicle M on the basis of states of the objects recognized by the recognizer 130 and controls one or both of the speed and steering of the subject vehicle M on the basis of the generated target trajectory, and the HMI controller 174 that displays images resembling the other vehicles recognized by the recognizer 130 as objects in the display device 32 superimposed on an image resembling a road on which the subject vehicle is present are included, and the HMI controller displays a first image resembling the first vehicle having an influence on the behavior of the subject vehicle M according to the automated driving control device 100 and second images resembling the second vehicles having influences on the generation of a target trajectory among the other vehicles recognized as objects with more emphasis than third images resembling third vehicles other than the first vehicle and the second vehicles, whereby driving control giving a secure feeling to a vehicle occupant can be performed.

According to an embodiment, an object that has an influence on the action plan of the subject vehicle M and becomes a control target (an action influencing target object) is displayed with more emphasis than images resembling the other vehicles from a time point at which it becomes the control target to a time point at which it becomes a non-control target (non-action influencing). In a case in which the subject vehicle M executes a lane changing event and in a case in which planned lane change becomes un-executable due to a rear-side vehicle or the like, there is no influence on lane keeping that is a current action plan (no change in the behavior of the vehicle), and accordingly, no emphasized display is performed, whereby a vehicle occupant can be allowed to easily perceive an object having an influence on the behavior of the subject vehicle M according to the automated driving control. According to an embodiment, by displaying a direction in which lane change of the subject vehicle M is disturbed, a vehicle occupant can be allowed to easily visually recognize a factor disabling lane change with differentiating another vehicle becoming a factor disturbing the lane change from the other vehicles.

[Hardware Configuration]

Figure 22:
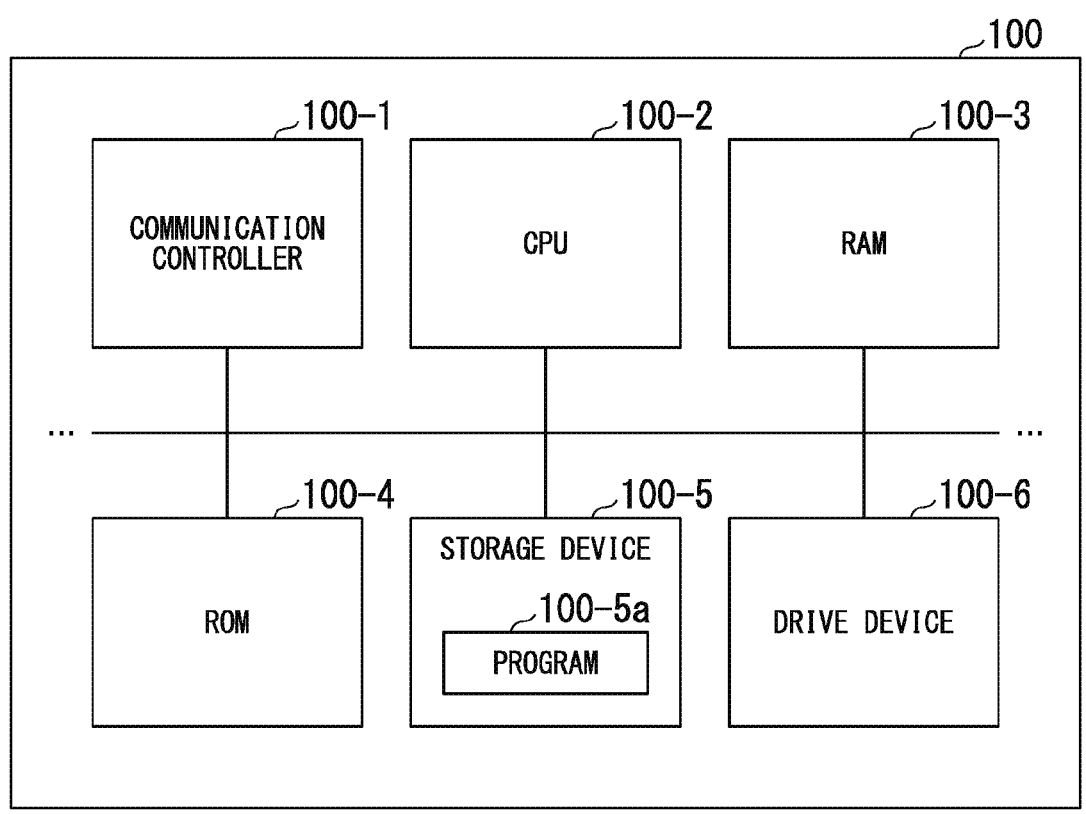
FIG. 22 is a diagram illustrating one example of the hardware configuration of an automated driving control device according to an embodiment.

FIG. 22 is a diagram showing one example of the hardware configuration of the automated driving control device 100 according to an embodiment. As illustrated in the drawing, the automated driving control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are interconnected through an internal bus or a dedicated communication line. The communication controller 100-1 communicates with constituent elements other than the automated driving control device 100. A program 100-5a executed by the CPU 100-2 is stored in the storage device 100-5. This program is expanded into the RAM 100-3 by a direct memory access (DMA) controller (not illustrated in the drawing) or the like and is executed by the CPU 100-2. In this way, some or all of the first controller 120, the second controller 160, and the third controller 170 are realized.

The embodiment described above can be represented as below.

A vehicle control device that includes a display device displaying images, a storage storing a program, and a processor, and the processor, by executing the program described above, is configured to recognize objects including other vehicles present in the vicinity of a subject vehicle, generate a target trajectory of the subject vehicle on the basis of states of the recognized objects, control one or both of a speed and steering of the subject vehicle on the basis of the generated target trajectory, display images resembling the other vehicles recognized as the objects in the display superimposed on an image resembling a road on which the subject vehicle is present, and display a first image resembling the first vehicle having an influence on the behavior of the subject vehicle and second images resembling second vehicles having influences on the generation of the target trajectory among the other vehicles recognized as the objects with more emphasis than third images resembling third vehicles other than the first vehicle or the second vehicles.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
a display that displays an image;
a recognizer that recognizes objects including other vehicles present in the vicinity of a subject vehicle;
a driving controller that generates a target trajectory of the subject vehicle on the basis of states of the objects recognized by the recognizer and controls one or both of a speed and steering of the subject vehicle on the basis of the generated target trajectory; and
a display controller that generates images resembling the other vehicles and an image resembling a road on which the subject vehicle is present based on recognition result of the recognizer, and causes to display the generated images resembling the other vehicles in the display superimposed on the generated image resembling a road,
wherein the display controller generates a first image resembling a first vehicle having an influence on a behavior of the subject vehicle according to the driving controller, a second image resembling a second vehicle having an influence on generation of the target trajectory, and a third image resembling a third vehicle other than the first vehicle and the second vehicle among the other vehicles recognized by the recognizer and causes to display the first image and the second image with more emphasis than the third image.

2. The vehicle control device according to claim 1, wherein the display controller causes to display the first image with more emphasis than the second image.

3. The vehicle control device according to claim 1, wherein the display controller causes to display an image indicating a direction in which a lane change of the subject vehicle is disturbed for the second image resembling the second vehicle that becomes a factor disturbing the lane change of the subject vehicle.

4. The vehicle control device according to claim 1, wherein the display controller continues the emphasis display of the first image until the first vehicle has no influence on the behavior of the subject vehicle and continues the emphasis display of the second image until the second vehicle has no influence on the generation of the target trajectory.

5. The vehicle control device according to claim 1, further comprising a communication device that performs inter-vehicle communication with the other vehicles,
wherein, in a case in which the behavior of the subject vehicle changes in accordance with a behavior of another vehicle received by the communication device, the display controller causes the display to display the other vehicle with which the inter-vehicle communication has been performed with emphasis as the first image.

6. The vehicle control device according to claim 1, wherein the display controller changes a display form of the image resembling the road based on the recognition result of the recoanizer.

7. A vehicle control method using an in-vehicle computer mounted in a subject vehicle including a display that displays images, the vehicle control method comprising:
recognizing objects including other vehicles present in the vicinity of the subject vehicle;
generating a target trajectory of the subject vehicle on the basis of states of the recognized objects;
controlling one or both of a speed and steering of the subject vehicle on the basis of the generated target trajectory;
generating images resembling the other vehicles and an image resembling a road on which the subject vehicle is present based on recognition result,
displaying the images resembling the other vehicles in the display superimposed on the image resembling a road;
generating a first image resembling a first vehicle having an influence on a behavior of the subject vehicle, a second image resembling a second vehicle having an influence on generation of the target trajectory, and a third image resembling a third vehicle other than the first vehicle and the second vehicle among the other vehicles recognized; and
displaying the first image and the second image with more emphasis than the third image.

8. A computer-readable non-transitory storage medium having a program stored therein, the program causing an in-vehicle computer mounted in a subject vehicle including a display that displays images to execute:
recognizing objects including other vehicles present in the vicinity of the subject vehicle;
generating a target trajectory of the subject vehicle on the basis of states of the recognized objects;
controlling one or both of a speed and steering of the subject vehicle on the basis of the generated target trajectory;
generating images resembling the other vehicles and an image resembling a road on which the subject vehicle is present based on recognition result,
displaying the images resembling the other vehicles in the display superimposed on the image resembling a road;
generating a first image resembling a first vehicle having an influence on a behavior of the subject vehicle, a second image resembling a second vehicle having an influence on generation of the target trajectory, and a third image resembling a third vehicle other than the first vehicle and the second vehicle among the other vehicles recognized; and
displaying the first image and the second image with more emphasis than the third image.

* * * * *